M. J. MILMOE.
BOX FORMING AND STAPLING MACHINE.
APPLICATION FILED MAR. 1, 1917.
1,438,252.
Patented Dec. 12, 1922.
10 SHEETS—SHEET 2.
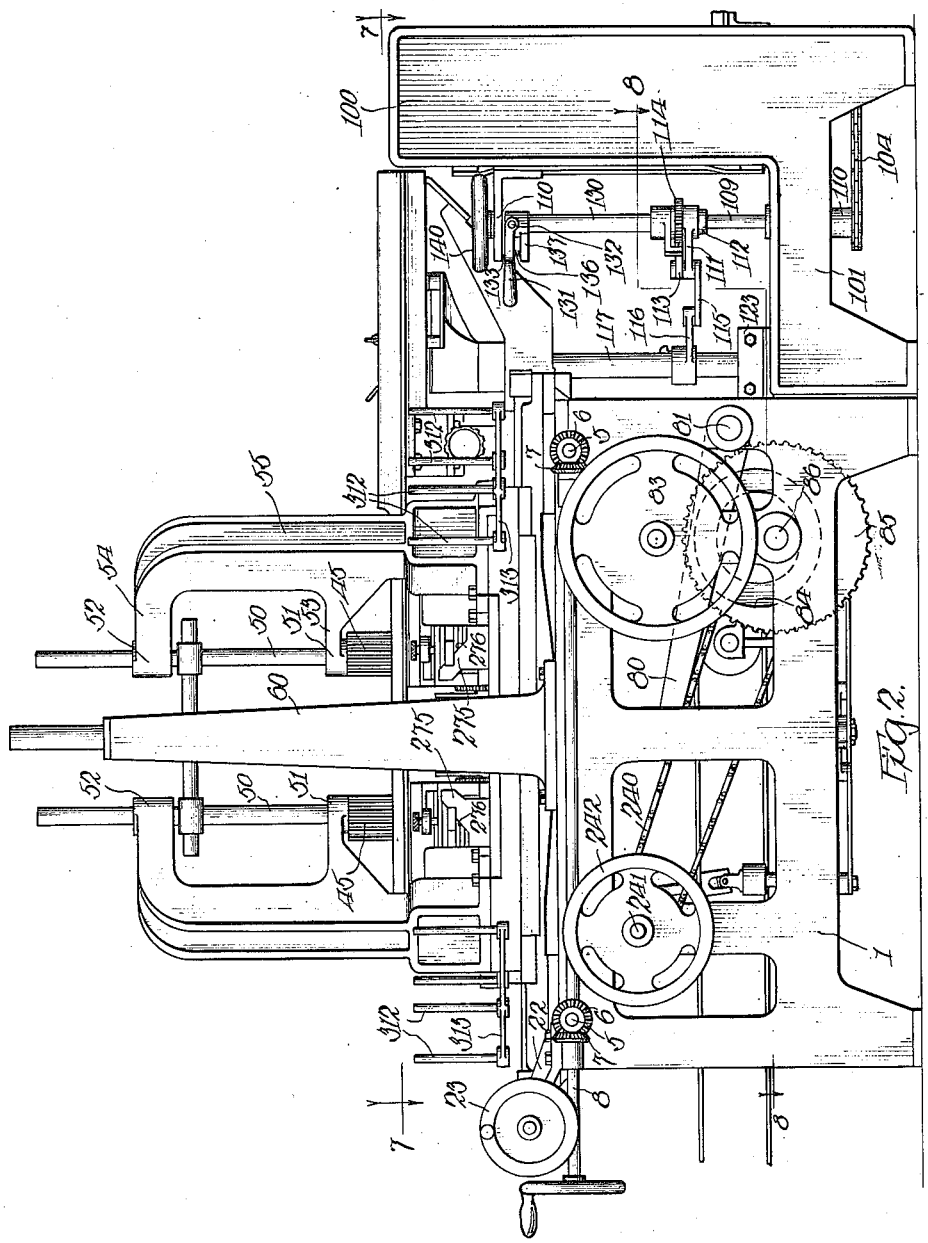
WITNESSES:
INVENTOR.
Michael J. Milmoe
BY
ATTORNEYS.

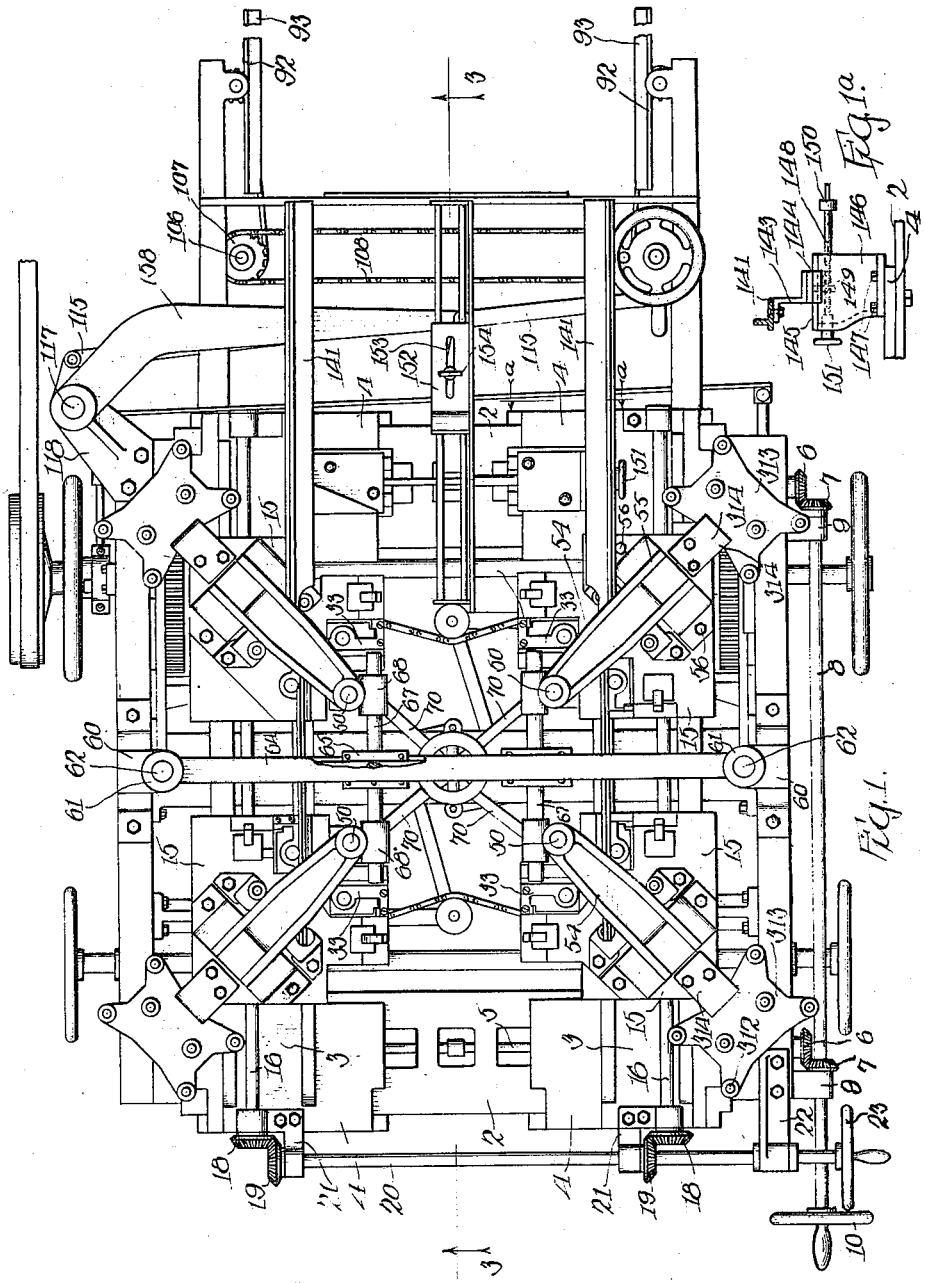

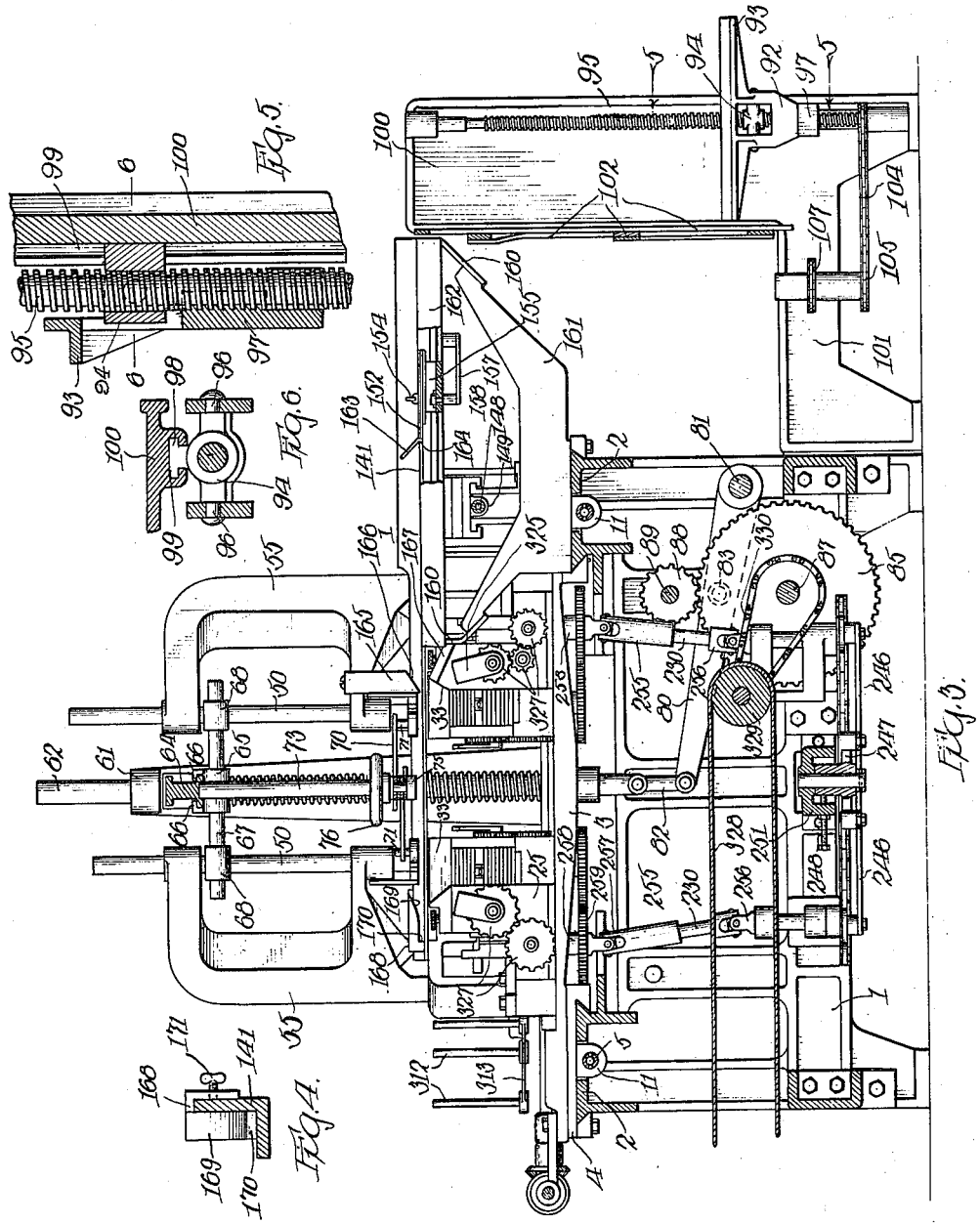

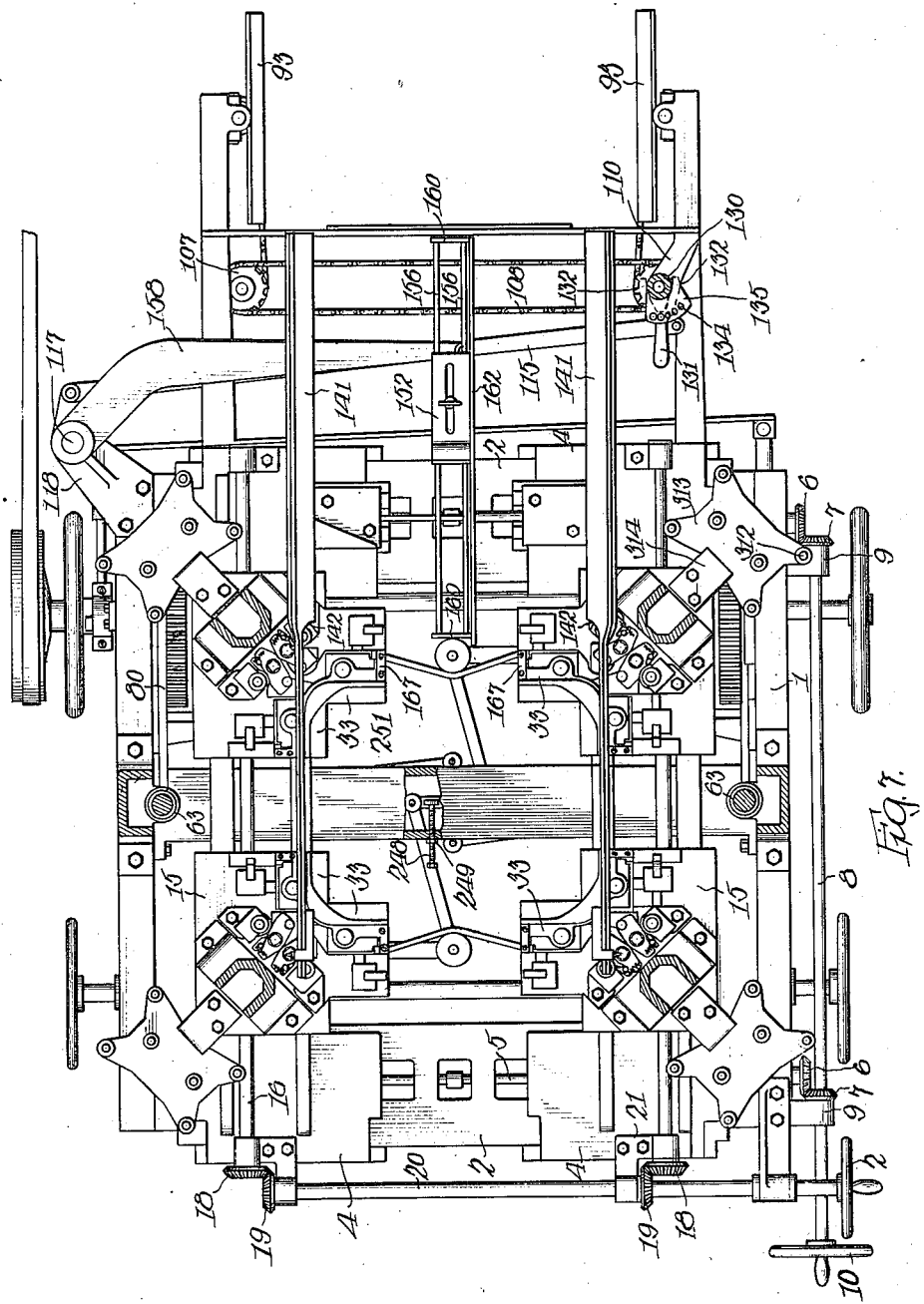

M. J. MILMOE.
BOX FORMING AND STAPLING MACHINE.
APPLICATION FILED MAR. 1, 1917.
1,438,252.
Patented Dec. 12, 1922.
10 SHEETS—SHEET 5.
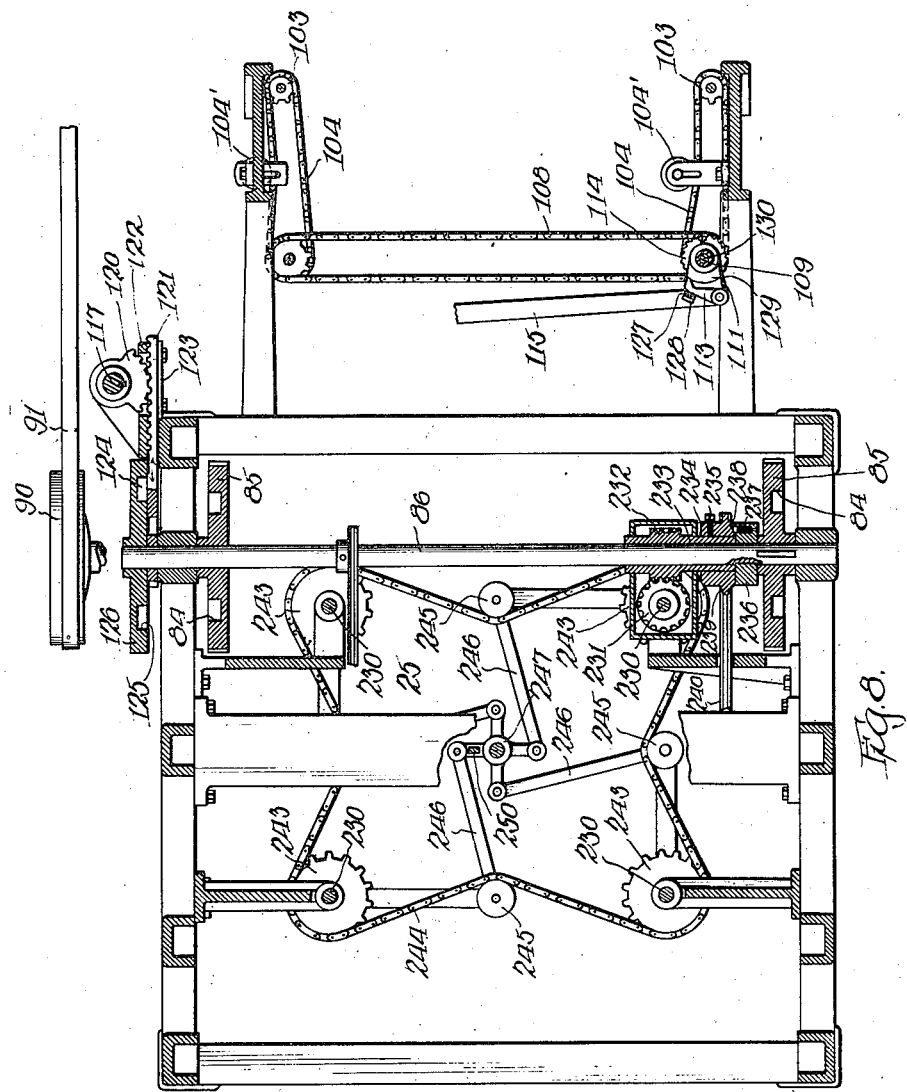

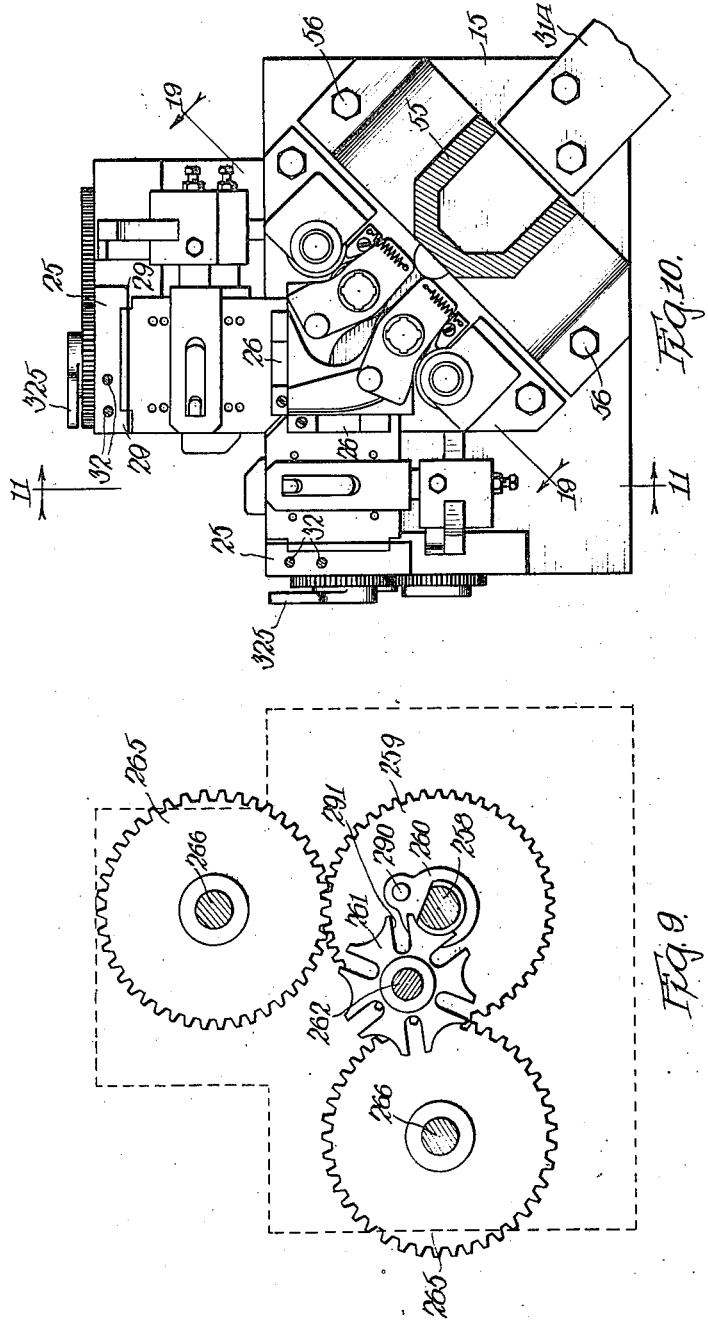

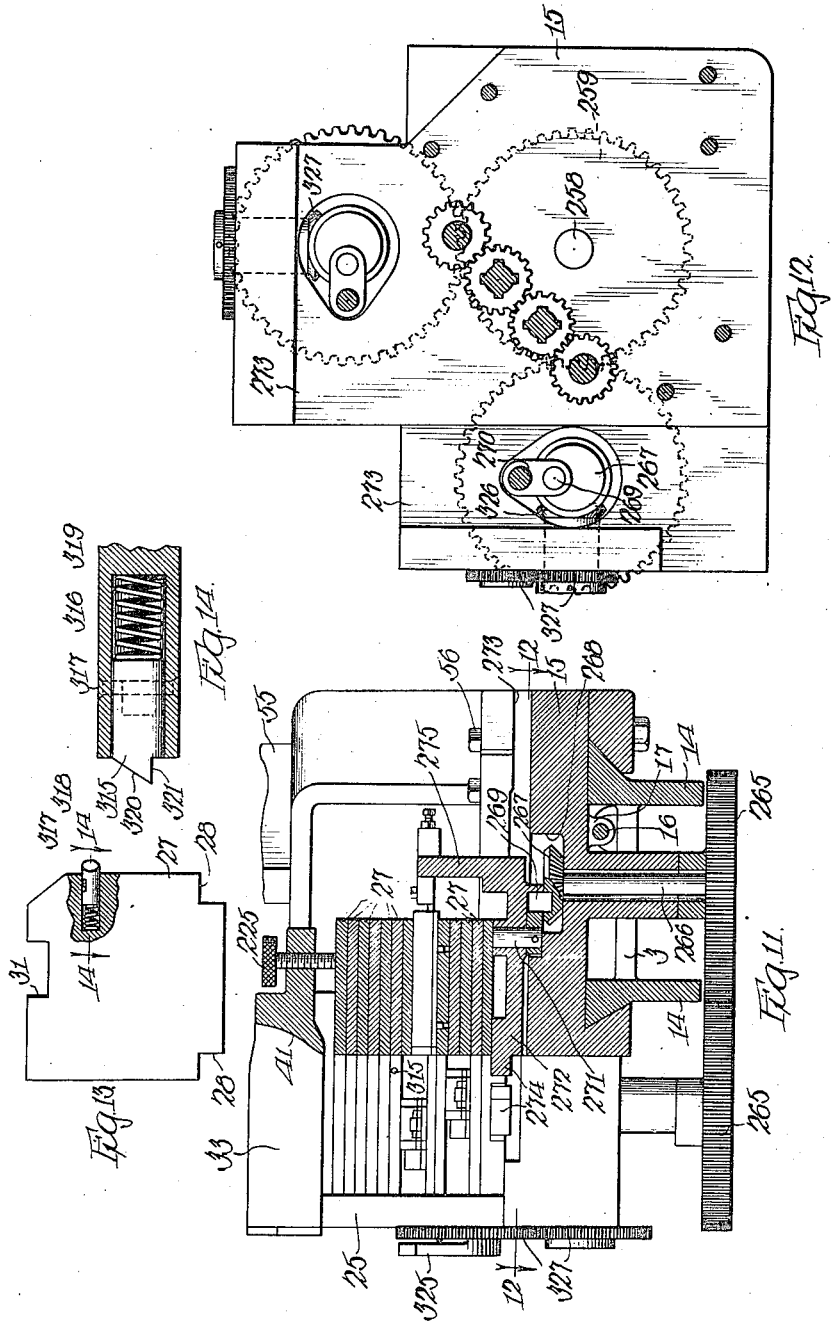

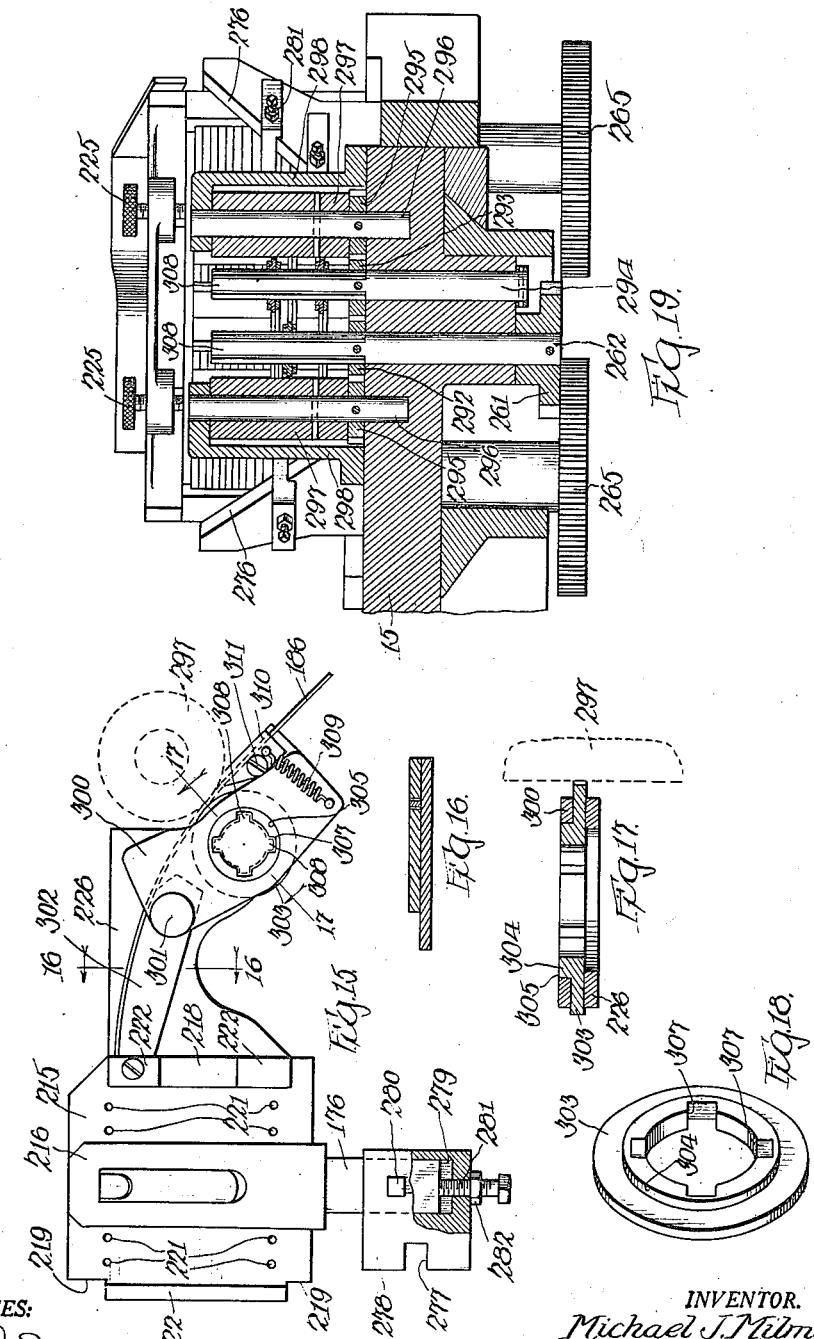

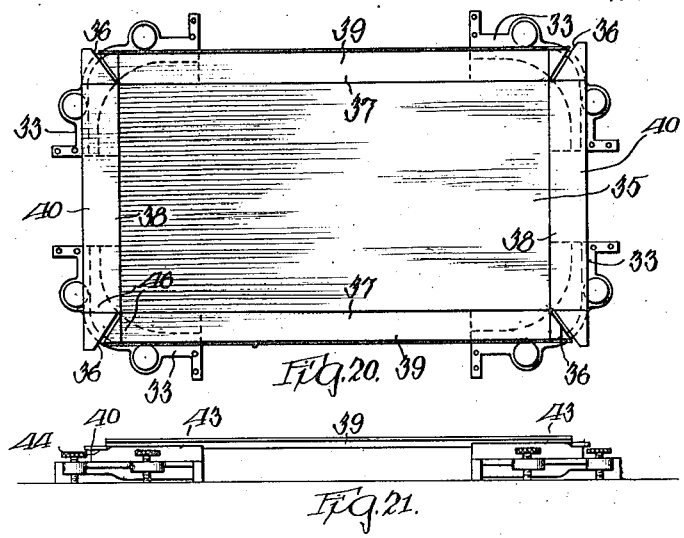
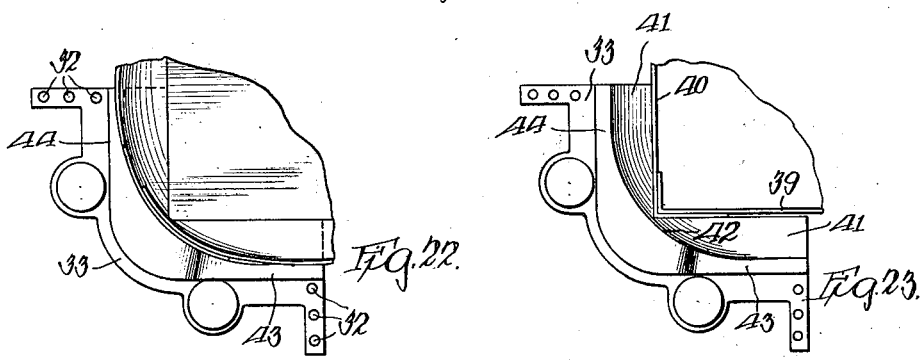
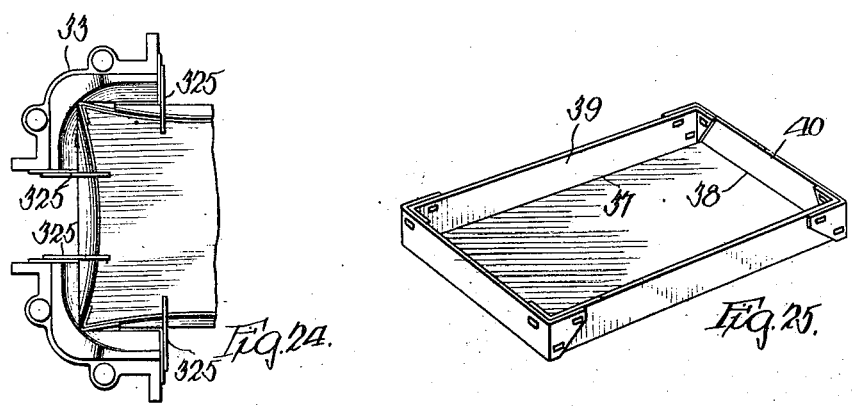

M. J. MILMOE.
BOX FORMING AND STAPLING MACHINE.
APPLICATION FILED MAR. 1, 1917.
1,438,252.
Patented Dec. 12, 1922.
10 SHEETS—SHEET 10.
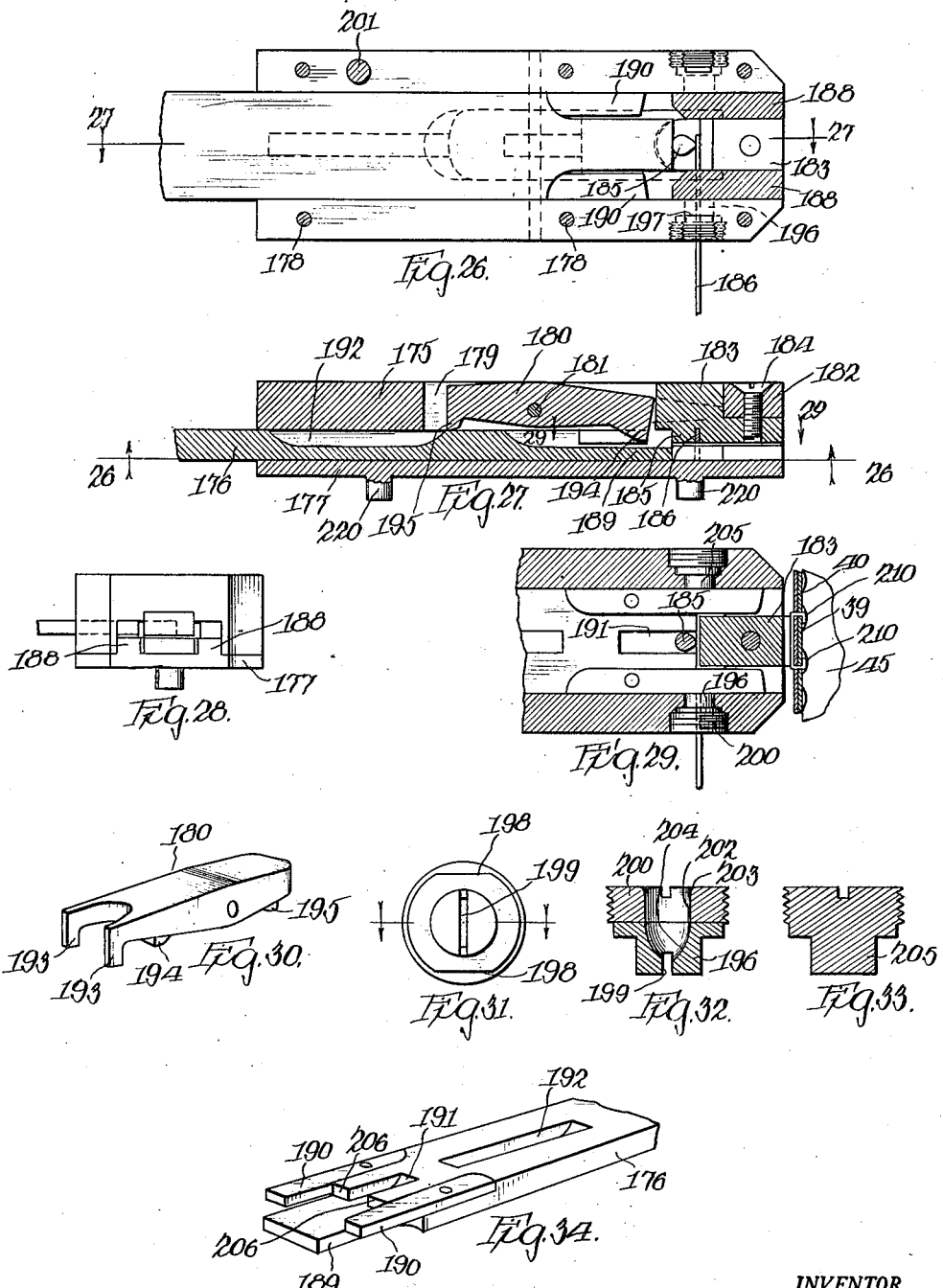

Patented Dec. 12, 1922.

1,438,252

UNITED STATES PATENT OFFICE.

MICHAEL J. MILMOE, OF CHICAGO, ILLINOIS, ASSIGNOR TO F. B. REDINGTON COMPANY, OF CHICAGO, ILLINOIS, A CORPORATION OF ILLINOIS.

BOX FORMING AND STAPLING MACHINE.

Application filed March 1, 1917. Serial No. 151,656.

*To all whom it may concern:*

Be it known that I, MICHAEL J. MILMOE, a citizen of the United States, residing at Chicago, in the county of Cook and State of Illinois, have invented certain new and useful Improvements in Box Forming and Stapling Machines, of which the following is a specification.

This invention relates to machines for forming boxes from blanks, and has for its object the provision of a device of the character named which shall be of improved construction and more efficient in operation than devices previously known.

The invention is exemplified in the combination and arrangement of parts shown in the accompanying drawings and described in the following specification, and it is more particularly pointed out in the appended claims.

In the drawings—

Fig. 1 is a top plan view of a machine embodying the present invention.

Fig. 1ª is a fragmentary sectional detail view on line a—a of Fig. 1.

Fig. 2 is a side elevation of the machine shown in Fig. 1.

Fig. 3 is a central longitudinal sectional view on line 3—3 of Fig. 1.

Fig. 4 is a sectional detail view showing a stop for the blanks.

Fig. 5 is a sectional detail view on line 5—5 of Fig. 3.

Fig. 6 is a fragmentary sectional detail view on line 6—6 of Fig. 5.

Fig. 7 is a horizontal sectional view substantially on line 7—7 of Fig. 2.

Fig. 8 is a horizontal sectional view substantially on line 8—8 of Fig. 2.

Fig. 9 is a detail horizontal sectional view showing the intermittent drive for the wire feed.

Fig. 10 is a horizontal sectional view showing the stapling mechanism for one corner of a box.

Fig. 11 is a vertical sectional view on line 11—11 of Fig. 10.

Fig. 12 is a horizontal sectional view substantially on line 12—12 of Fig. 11, but showing parts not shown in that figure.

Fig. 13 is a plan view of one of the blocks used for holding the stapling mechanism in adjusted positions with part broken away to show one of the box strippers.

Fig. 14 is a fragmentary sectional view on line 14—14 of Fig. 13 showing the stripper in detail.

Fig. 15 is a detail plan view showing one of the stapling units.

Fig. 16 is a detail sectonal view on line 16—16 of Fig. 15.

Fig. 17 is a detail sectional view on line 17—17 of Fig. 15.

Fig. 18 is a perspective view of a wire feeding roller.

Fig. 19 is a fragmentary sectional view on line 19—19 of Fig. 10.

Fig. 20 is a diagrammatic view showing in plan a blank ready to be formed into a box.

Fig. 21 is an elevation of the parts shown in Fig. 20.

Fig. 22 is a plan view of one corner of the box folder showing a box corner partially folded.

Fig. 23 is a view similar to Fig. 22 with a box corner completely folded.

Fig. 24 shows two corner folders of the box former as the box is being discharged therefrom.

Fig. 25 is a perspective view of a completely formed box.

Fig. 26 is a sectional view of one of the stapling heads, the sections being taken on line 26—26 of Fig. 27.

Fig. 27 is a vertical sectional view of a stapling head on line 27—27 of Fig. 26.

Fig. 28 is an end elevation of a stapling head looking from the right in Fig. 26.

Fig. 29 is a detail sectonal view on line 29—29 of Fig. 27.

Fig. 30 is a perspective view of the staple shifting lever forming a part of the stapling mechanism.

Fig. 31 is an end elevation, and Fig. 32 a section respectively of the wire guide for the stapling head.

Fig. 33 is a section of a wire stop plug for the stapling head; and

Fig. 34 is a perspective view of the forward end of the staple forming and driving plunger.

The embodiment of the invention shown in the drawings consists generally of an open form onto which a blank of paper board or other material is fed, and includes plungers for moving the board into the form to fold the sides of the blank into box formation, and duplicate stapling mechanisms, one located at each corner of the box for securing the folded corners, and mechanism for trueing up the sides of the box and discharging it from the machine.

In the drawings, the numeral 1 designates a framework of sufficient strength and rigidity for supporting the various operating parts of the machine and forming in a general way a table on which the operating parts are supported. The upper portion of this table comprises a pair of ways 2, one at each end of the table, as shown in Fig. 3, and extending transversely thereof. Mounted on these ways, one at each side of the table and arranged to move transversely of the table upon the ways, are two supporting beams 3, shown in Figs. 1, 3 and 11. The supporting beams 3 are provided at each end with a plate or block 4 which rests upon one of the ways 2, and is arranged to slide thereon to adjust the supporting beams 3 transversely of the table. Blocks 4 are moved along the ways 2 by a pair of shafts 5, one of which is located beneath each of the ways and which are driven by beveled gears 6, as shown in Fig. 2. The beveled gears 6 mesh with corresponding gears 7, carried on a shaft 8, journaled in bearings 9 attached to the side of the framework 1, as shown in Fig. 1. The shaft 8 is provided with a hand wheel 10 by means of which the gears 6 and 7 are rotated to drive the shafts 5. Each of the shafts 5 is provided with threaded engagement with downwardly projecting lugs 11 on each of the slide blocks 4, as shown in Fig. 3. Engagement with one of the blocks 4 is by means of a right hand thread, and engagement with the other is by means of a left hand thread, so that when the shaft 5 is rotated, the blocks are simultaneously moved either toward or away from one another, depending upon the direction of rotation of the hand wheel 10. Since the two shafts 5 are rotated by the common drive shaft 8, the blocks at opposite ends of the table are caused to move simultaneously so that rotation of the hand wheel 10 moves the entire supporting beams 3 transversely of the table, the beams being moved either toward or away from one another under control of the hand wheel 10.

Each of the beams 3 is provided with a pair of vertically disposed webs 14, the upper edges of which webs form a slideway for castings or blocks 15, there being a pair of castings 15 on each of the beams 3 and arranged to slide longitudinally thereon toward and away from one another. The blocks 15 are slid longitudinally along the beams 3 by shafts 16, there being a shaft 16 disposed within each of the beams 3 below the blocks 15 thereof, as shown in Figs. 1 and 11. Each of the shafts 16 is provided with right and left hand threaded engagement with the two blocks respectively carried on the beam 3 with which the shaft is associated, as shown at 17, in Fig. 11. Beveled pinions 18 are secured to one end of each of the shafts 16 and mesh with corresponding pinions 19 splined to a shaft 20 and free to slide along the shaft. The shaft 20 is journaled in bearing brackets 21 secured to the top of the blocks 4, which brackets are also provided with bearings for the shafts 16, as shown in Fig. 1. The shaft 20 is provided also with a bearing bracket 22 fixed to the upper surface of the slideway 2, as shown in Figs. 1 and 2. The shaft is provided with a hand wheel 23 by means of which it is rotated. It is apparent that by this construction the blocks 15 on each of the beams 3 may be moved toward or away from one another by rotation of the hand wheel 23. The adjustment of all of the blocks 15 is simultaneous, since they are all controlled by the same hand wheel. By combining the movements produced by the two hand wheels 10 and 23, the blocks 15 may be adjusted toward or away from one another as desired, but are always maintained in rectangular relations with one another.

Each of the blocks 15 is provided with the form for folding one corner of the box blank, by means of which the sides and ends of the blank are folded upwardly to form a box. Each block 15 also carries stapling mechanism for securing the folded sides of the box in place. The mechanism is substantially the same on each of the four blocks, and so a description of one of these units will be sufficient for all. Referring to Fig. 10, it will be seen that the block 15 has a right angular notch cut out of its inner corner, as shown at the upper left hand portion of the figure, and that adjacent the sides of this notch are upright plates 25, one of which is shown also in Fig. 11. Upright bars 26 also extend upwardly from the casting 15 and form together with the plates 25, means for holding a series of spacer blocks 27, Fig. 13, in position. The blocks 27 are provided with notches 28 at the corners thereof, which receive ribs 29 extending vertically along the sides of the plates 25. The blocks 27 are also provided with notches 31 for receiving the upright bars 26. The blocks 27 are for the purpose of securing the stapling mechanism in adjusted positions so that the corners of the boxes when folded may be secured in a manner to be described. Secured to the upper edges of the upright plates 25, by means of machine screws 32, is a corner folder 33 for the box blanks, which is best shown in Figs. 20 to 24 inclusive. This folder is shown in position in Figs. 1, 3 and 11. One of the blanks from which the box is formed, is shown in position on top of the four corner folders 33 at the beginning of a folding operation in Fig. 20 of the drawings. The blank 35 is slitted at each corner, as shown at 36, and is scored along lines 37 and 38 to facilitate folding along these lines. The flaps 39 fold upwardly to form the side walls of the box, while the flaps 40 are folded upwardly to form the end walls. The flaps 39 and 40 are of the same width, but in Fig. 20 of the drawings, flaps 39 are shown somewhat foreshortened, because of the fact that they are shown partially folded in this figure.

The bottom portions of the inner walls of the corner folders 33 are arranged at right angles with one another, forming a square corner into which the corner of the box fits when compeletely folded, as shown in Fig. 23. The inner walls of the folders slope outwardly however from their bottom edges at the ends of the two angular legs of the folders, as shown at 41, in Figs. 11 and 23. The folding surface 41 is rounded off however, so that the wall is substantially vertical at the apex of the angle formed by the meeting of the two legs thereof. This is indicated by the line 42, Fig. 23, which represents the upper edge of the sloping wall 41. In order that the side flaps 39 may be folded inside of the end flaps 40, their inward movement must begin before that of the flaps 40, and to secure this preliminary movement, the portion 43 of the upper surface of the corner folders 33, which contacts with the side walls 39, is made somewhat higher than the corresponding portion 44, which contacts with the end walls 40, as is shown in Figs. 21 and 23. Plungers 45 operated by mechanism to be described are provided for forcing the blanks 35 downwardly through the form made up by the folders 33. These plungers 45 are provided with right angular surfaces which are spaced inwardly from the inner surfaces of the folders 33 a sufficient distance to allow for the thickness of the sides of the box between the plungers and the folders. In operation, the lower surfaces of these plungers are brought to bear on the portion of the box blank which forms the box bottom adjacent the folders and move downwardly in unison to carry the blank downwardly through the space between the folders. As the blank moves downwardly, the ends of the side flaps 39 are first folded inwardly because of the raised portions 43 of the folders, and these ends are followed closely by the ends of the flaps 40, the ends of the two flaps sliding closely on one another in a curved formation, as shown in Fig. 22. During this part of the folding operation, the middle portions of the flaps remain much lower than the end portions due to the resistance of the flaps to bending, and due also to the fact that the folders are beveled at 41 as previously explained, thus causing the folding action to proceed much more rapidly at the corner of the box than it does toward the central portions of the sides. This produces a curved contour in the sides being folded so that the end of the inner flap will slide on the inner surface of the outer flap, permitting the two flaps to be folded together simultaneously and at one operation. If it were attempted to fold the entire length of the flaps inwardly at the same rate of speed, it is at once apparent that the end of the inner flap would butt squarely against the inner surface of the outer flap and that a crumpling instead of a folding operation would result. This curved formation of the flaps during the folding is all the more important in view of the fact that the side flaps are scored along lines 46 upon which the ends of the flaps are folded when they are brought into permanent position. It is clear that the inner end of the side 39 must slide past the score line 46 on the end flap 40. As the plungers continue to move the blank downwardly through the folders, the sides 39 and 40 are brought into their upright position by the lower edges of the inner walls 41 of the folders, thus squaring the corners of the box and bringing the score lines 46 into registration with one another, as shown in Fig. 23. In this way all four sides of the box are brought into position simultaneously, and when thus folded they are secured in this position by wire staples driven by mechanism to be described. It is apparent that the folders 33 can be adjusted relative to one another by means of the adjusting wheels 10 and 23 and the associated mechanism previously described, so that rectangular boxes of varying sizes and shapes may be formed.

The plungers 45 by means of which the blanks are forced through the folders are carried at the lower ends of upright rods 50, which slide in bearings 51 and 52, Fig. 1. The bearings 51 and 52 are located at the ends of inwardly projecting arms 53 and 54 respectively, which are supported by upright standards 55 fastened to the upper surface of the blocks 15 by lag screws 56, as shown also in Figs. 1, 10 and 11. Since the standards 55 are rigidly secured to the castings 15, which also carry the corner folders 33, it is apparent that the plungers 45 will also bear a fixed relation to the corner folders regardless of the position of adjustment of the folders for different sized boxes.

The mechanism for reciprocating the plungers 45 is illustrated in Figs. 1, 2 and 3. Extending upwardly from each side of the frame member 1, midway between the ends of the ways 2, are two standards or pedestals 60, having bearings 61 at their upper ends in which slide a pair of vertical rods or shafts 62. At the lower ends, the rods 62 slide through openings in lugs 63, Fig. 7, secured to the pedestal 60. An I-beam 64 connects the rods 62 below the upper bearings 61, and is rigidly secured at its opposite ends to the rods. A pair of slides 65 are mounted to move back and forth along the I-beam 64, the slides having overlying flanges 66, Fig. 3, which bear upon the upper surfaces of the lower flange of the I-beam 64. Each of the slides 65 carries a cross-rod 67 rigidly secured thereto, and these cross-rods 67 have their ends arranged to slide in collars 68, which collars are rigidly carried by the plunger rods 50. When the standards 55 and associated parts are moved along the beams 3 to adjust the standards longitudinally of the machine, the collars 68 slide toward or away from one another along the cross-rods 67. When the standards 55 are adjusted transversely of the machine by sliding movement of the beams 3 upon the ways 2, the rods 67 move with the standards toward or away from one another, this movement being permitted by the slides 65 sliding on the I-beam 64. By this arrangement, the plunger rods 54 are held in fixed relation with the bars 62 as regards vertical movement, but are free to move relative to one another in horizontal directions. The plunger rods 50 may be locked in their horizontally adjusted positions by means of a series of bars 70. The bars 70 are pivotally secured at their outer ends to upstanding lugs 71, Fig. 3, carried on the inner portions of the plungers 45. The inner ends of the bars 70 are slotted, and these slotted ends are carried for sliding movement on a pin 72, secured at the lower end to a rod 73 which is rigid with and projects downwardly from the middle of the I-beam 64. A head 75 secured to the lower end of the pin 72 holds the bars 70 in place on the pin. A hand wheel 76 is threaded on the lower end of the rod 73, and by means of this hand wheel the slotted ends of the bars 70 may be rigidly clamped between the hand wheel and the head 75 to hold the pin 72, together with the associated plungers 45 and plunger rods 50, in whatever adjusted position it may be placed. The bars 62, the I-beam 64, the plungers 45, and the connecting parts have a vertical reciprocatory movement imparted thereto by means of arms 80. The arms 80 are pivoted to oscillate vertically upon the shaft 81 as an axis and have their opposite ends connected with the bars 62 by means of links 82 so that oscillatory movement of the arms is transmitted to the bars 62 and the connected mechanism. The arms 80 are oscillated by cam rollers 83, which operate in cam grooves 84, formed in the outer lateral faces of gear wheels 85, which are rigidly mounted on a shaft 86, as shown in Figs. 2, 3 and 8. The gear wheels 85 mesh with pinions 88, secured to a main drive shaft 89, which is driven by a pulley 90 and belt 91, or by any other suitable power device.

The blanks from which the boxes are formed are brought to the machine on boards or trays resting on low trucks, and these trucks when moved to a position between blank brackets 92, Figs. 1, 3, 5 and 7, bring the ends of the trays or boards on which the blanks rest to a position just above projecting ledges 93 on the brackets 92. The brackets 92 are pivotally supported on slide blocks 94, which surround upright screw-threaded standards 95. The sides of the blocks 94 are bored to fit the outer circumference of the screw threads on the standards 95 and slide freely over the threads. The brackets are carried by pivots 96 projecting laterally from the slide blocks 94 and are provided with downwardly extending half nut portions 97 which are threaded, as shown in Fig. 5, to mesh with the threads on the standards 95. The brackets are free to swing about pivot pins 96 to bring the half nuts 97 into and out of engagement with the threads on the standards. When there is a load upon the ledges 93, the weight of the load forces the half nuts 97 into engagement with the threaded standards, thus holding the brackets in adjusted positions along the standards. When the brackets are free from the load, they may be oscillated about their pivots 96 and moved freely into any position of adjustment along the standards that may be desired. The slide blocks 94 are provided with rearwardly extending dovetail portions 98, which interlock with slideways 99 formed in upright frame plates 100 positioned at the right end of the machine as it is viewed in Figs. 1, 2 and 3. The frame plates 100 are rigidly connected with the main frame 1 by horizontal bars 101, so that the plates 100 and bars 101 form substantially a continuation of the main frame 1. A lattice work of cross-bars 102 forms a back wall for positioning the inner edges of the blanks when they are placed upon the supporting brackets 92. The brackets 92 with their superimposed load of blanks are fed upwardly during the operation of the machine by a rotation of the screws 95, which rotation is produced by mechanism best shown in Figs. 1, 2, 3, 7 and 8. The screw-threaded standards 95 are provided at their lower ends with sprocket wheels 103, which are driven by chains 104, having chain tighteners 104' associated therewith. The chain 104 on the side of the machine adjacent the power belt 91 is driven by a sprocket wheel 105, carried on a stud shaft 106, driven by a sprocket wheel 107 and chain 108. The chain 104 at the other side of the machine and the chain 108 are driven by sprocket wheels secured to an upright shaft 109, mounted in bearings 110 secured to the frame members 100 and 101. The shaft 109 has an arm 111 mounted to oscillate thereon, and supported by a collar 112. A pawl 113 is supported at the outer end of the arm 111 and arranged to engage with teeth on a ratchet wheel 114 rigidly secured to the shaft 109, as shown in Figs. 2 and 8. A reciprocatory motion is imparted to the arm 111 by a connecting rod 115 having one end pivoted to the arm 111, and the other end pivotally secured to an arm 116 fastened to an upright shaft 117, mounted in bearing brackets 118 and 119 secured to the framework 1 at the side thereof adjacent the belt pulley 90. The shaft 117 is oscillated by a gear segment 120, Fig. 8, which meshes with a rack bar 121 mounted for sliding movement in a guide 122 secured to the frame of the machine and held in place in the guide by a plate 123 secured thereto. The rack bar 121 is driven by a cam roller 124, which meshes with a cam groove 125 formed in a cam wheel 126 secured to the shaft 86. By this arrangement the connecting rod 115 and the pawl 113 is given a complete oscillation once for each rotation of the shaft 86. The pawl 113 is pressed into contact with the ratchet wheel 114 by a spring 127, held by a projection 128 connected with the arm 111. The amount of movement of the ratchet wheel 114 for each oscillation of the pawl 113 is regulated by a cam 129, carried by a sleeve 130 which surrounds the shaft 109, as shown in Figs. 2 and 8. The cam 129 disengages the pawl 113 from the ratchet 114 during the backward stroke of the pawl, and the amount of rotation of the ratchet wheel will depend upon the point at which the pawl is disengaged therefrom. The point of disengagement may be regulated by rotation of the sleeve 130 to which the cam 129 is secured. The adjustment of the position of this sleeve is accomplished by means of a lever 131, Figs. 2 and 7, which is pivotally secured to the sleeve 130 by pins 132. The lever 131 is held in adjusted position by an upwardly projecting pin 133 which is arranged to register with a number of holes 134 in an extension 135 of the bearing member 110. The lever 131 is pressed upwardly to force the projection 133 into engagement with the holes 134 by a spring 136, carried by a projection 137 secured to the sleeve 130. To regulate the amount of rotation of the shaft 109 for each oscillation of the pawl 113, the lever 131 is forced downwardly and moves to the right or left to shift the position of the cam 129, and thus vary the effective length of the stroke of the pawl 113. By this mechanism, the blanks resting upon the brackets 92 are gradually fed upwardly as the machine operates to keep the top of the stack of blanks at a convenient height from which the blanks may be taken to be fed to the machine in a manner to be described. The rate at which the blanks are fed upwardly can be easily regulated by the hand lever 131, and the shaft 109 is additionally provided with a hand wheel 140 by which the height of the stack may be manually adjusted whenever it is desired.

At each operation of the machine a blank is taken by the operator from the top of the stack carried on the brackets 92 and placed upon guides 141, shown in Figs. 1, 1ª, 3 and 7. The guides 141 are in the form of angle bars, as shown in Fig. 1ª, and extend inwardly into a position above and just outside of the corner folders 33. These guides have their horizontal web cut away, as shown at 142, Fig. 7, to permit the blanks to be easily moved downwardly by the plungers 45. The guides are supported, as shown more especially in Fig. 1ª, upon brackets 143, carried by slides 144 mounted on slideways 145 formed upon the upper surface of supports 146 secured by bolts 147 to the upper surface of the blocks 4 mounted for sliding movement on the way 2 at the forward end of the machine. The brackets 143 are adjusted on the slideways 145 by a shaft 148 which has threaded engagement with a lug 149 which projects downwardly into the interior of the support 146, the support being hollow. The shaft 148 is made of two sections which telescope with one another, one of the sections being square and fitting in a corresponding opening in a collar 150 carried by the other section. This arrangement permits adjustment of the supports 146 for the two guides 141 toward and away from one another without disturbing the connection of the shaft 148 with the brackets 143 which support the guides. The opposite ends of the shaft 148 which engage the brackets 143 are provided with right and left hand threads respectively, so that rotation of the shaft by means of a hand wheel 151 will simultaneously move the guides 141 toward or away from one another upon the slideways 145. It is thus apparent that the guides 141 have two independent adjustments toward and away from one another, one of these adjustments being in unison with the movement of the blocks 4 and the mechanism carried thereby, and the other adjustment being independent of the movements of these blocks and produced by rotation of the hand wheel 151. The adjustment which takes place in unison with the blocks 4 accommodates the guides to various widths of boxes simultaneously with the adjustment of the corner folders for various sized boxes. Since the spacing of the corner folders is regulated by the distance between the score lines 38 of the boxes, Fig. 20, it is necessary to arrange a separate adjustment to provide for different widths of the end flaps 40. This second adjustment is the one which is accomplished by the movement of the 130 brackets 143 on the slideways 145 and produced by rotation of the hand wheel 151.

The blanks are placed upon the guides 141 in advance of a sliding follower 152, which is shown at about its mid position in Figs. 1, 3 and 7. The follower 152 is adjustably connected by means of a slot 153, a thumb nut 154 with a carriage 155 mounted to slide on guide rods 156 secured to the frame of the machine. The carriage 155 is pivotally connected by means of a link 157 with the end of an oscillating arm 158. The arm 158 is rigidly secured to the upright shaft 117 which is oscillated once for each rotation of the shaft 86 by mechanism previously described. The guide rods 156 are secured at their ends to plates 160 secured to the opposite ends of an irregular shaped plate 161 fastened to the slideway 2 near the center thereof. The plates 160 also carry a bar 162, the upper edge of which is in the same horizontal plane as the upper surface of the guides 141. The bar 162 supports the central portions of the blanks as they are being fed to the machine. At each operation of the machine, the attendant places a blank in front of the follower 152 which is provided, as shown in Fig. 3, with an upwardly inclined engaging plate 163 having an offset notch 164, at the bottom portion thereof for engagement with the edge of the blank. As the blank is moved forwardly it is directed into position by guides 165, Fig. 3, having beveled edges 166 for directing the forward edge of the blank downwardly. To prevent the forward edge from drooping downwardly, upwardly sloping guiding blocks 167 are attached to the corner folders 33, as shown in Figs. 3 and 7, and direct the edges upwardly into the proper horizontal plane. The forward movement of the blanks is limited by stops 168, one of which is secured to each of the guides 141. These stops, as shown in Fig. 3, are provided with inclined surfaces 169 which catch the forward edge of the blank and direct it against the abutment surface 170 by which the forward movement is limited. As shown in Fig. 4, the stop 168 extends over the vertical flange of the guide 141 and is held in adjusted position thereon by a thumb nut 171 so that the stop may be easily adjusted longitudinally of the guide.

The stitching or stapling of the box corners to hold them in the position in which they are folded by the corner folders 33 and the plungers 45, takes place at the time that the plungers are in their extreme lower position and is accomplished by a series of stapling heads held in place by the spacer blocks 27. As shown in Fig. 10, there are two sets of these blocks at each corner of the machine, each set consisting of a stack of blocks piled upon one another, as shown more clearly in Fig. 11. The blocks as previously stated are held in place by upright plates 25 and upright bars 26 rigid with the slide blocks 15, and the inner face of each stack of blocks is in vertical alinement with the inner face of the corresponding corner folder 33. It will thus be seen that when the box blank has been forced through the corner folders, the overlapping corner portions of the side flaps will lie adjacent the vertical edges of the blocks 27 and between these edges and the sides of the plungers 45. The stapling heads, as shown in Fig. 11, are interpolated between the blocks 27 and may be spaced at any vertical position desired by shifting the number of blocks that is above and below the stapling head. The operating ends of the stapling heads are caused to aline with the inner vertical edges of the spacers so that a staple forced outwardly from the stapling head pierces the overlapping flaps of the box corners, and the ends of the legs are then bent over by contact with the face of one of the plungers 45. The construction of the stapling head will best be understood by reference to Figs. 26 to 34 inclusive. The stapling head consists of a casing block 175 slotted on its lower side to receive a plunger 176. A bottom cover plate 177 is secured to the lower side of the casing block by machine screws 178. A slot 179 is cut through the upper central portion of the casing block extending from the slot for the plunger 176 upwardly entirely through the casing block. A staple shifting lever 180 is pivoted on a pin 181 to oscillate in the slot 179. The slot 179 does not extend entirely to the front end of the casing block 175, but a sufficient amount of the block is left at that end to form a crossbar 182 to which a wire guide and anvil block 183 is secured by means of a screw 184. This block is provided with a downwardly extending lug 185. The forward edge of this lug 185 forms with the rear surface of the anvil 183 a passageway through which the wire 186 passes, as shown in Figs. 26 and 27. The lower cover plate 177 is provided at its front edge with a pair of upwardly projecting lugs 188 which lie adjacent the inner walls of the plunger groove at the forward end of the stapling head, as shown in Figs. 26 and 28. The shape of the plunger 176 is best shown in Fig. 34 in which it will be seen that the forward end of the plunger is provided with a tongue 189 by means of which the staples are driven into the box corners, and above and on each side of this plunger is a shearing bar and former 190. The upper surface of the plunger is provided with a pair of cam grooves 191 and 192 for operating the staple shifting lever 180. This lever is bifurcated at its forward end, as shown best in Fig. 30, and each bifurcation carries a downwardly projecting finger 193 for contacting with the staples after they have been formed to shift their position in a manner to be described. The lever 180 has projections 194 and 195 at its front and rear ends respectively for contacting with the cam grooves 191 and 192. The staple wire is fed to the stapling head through a wire guide 196 which fits in an opening in the side of the casing block 175 opposite the rear face of the handle portion of the block 183. The opening for the guide 196 extends downwardly a sufficient amount so that it cuts through the lower surface of the frame casing 175, as shown at 197, in Fig. 26. The guide is cut away, as indicated at 198, Fig. 31, so that one of the flat sides 198 will lie in the plane of the lower surface of the casing frame 175 when the wire guide is in place and in position to bring the opening 199 therein into vertical position. The wire guide 196 is held in place by a screw-threaded plug 200 which fits into a threaded opening in the casing frame 175 in the rear of the guide 196. The opening for the plug 200 is formed while the cover plate 177 is in place so that the opening extends partially into the upper surface of the cover plate. This cover plate is provided with a centering pin 201, which pin, together with the projecting lugs 188 insures accurate positioning of the plate relative to the casing frame 175. The screw-threaded plug 200 is centrally bored at 202 to receive the wire 186, the outer end of the bore being beveled, as shown at 203, to guide the wire into place. The opening 202 of the screw-threaded plug extends into the wire guide and is tapered inwardly, as shown at 204, to properly direct the wire into the slot 199. In order that the stapling head may be easily transformed from a right hand to a left hand head, a second opening is provided in the casing block 175 opposite the wire guide 196, and is normally closed by an abutment plug 205. The end of this plug forms an abutment which limits the inward movement of the wire into the stapling head, and the head may be easily changed from a right hand to a left hand device by shifting positions of the plugs 196 and 205. The plug 205, as shown in Fig. 33, is integral with the screw-threaded portion instead of being formed in two parts as is the plug 196 and its threaded holder 200.

During a stapling operation the wire is fed through the slot 199 by mechanism to be described, the wire reaching approximately the position shown in Fig. 26 at the time the plunger 176 begins its forward stroke. As the plunger continues to move forwardly, the wire is fed farther into the stapling head so that by the time the shearing and staple forming bars 190 reach the wire, it will extend across the slot formed in the casing block 175 for the plunger. As will be seen from Fig. 27, the driving tongue 189 during this forward stroke will pass below the wire 186 so that the wire is first contacted by the forward ends of the shearing and forming bars 190. Either at the time, or just before the bars 190 reach the wire, the forward movement of the wire ceases and the feeding thereof is discontinued until a later period in the cycle of operation. As the plunger continues to move forwardly the wire is severed by one of the bars 190, and the two ends of the severed portion are bent about the rear or anvil face of the block 183, thus forming the two legs of the staple. During this bending movement, the central portion of the crossbar of the staple is prevented from bulging backwardly by its contact with the downwardly extending projection 185. The cut away portion of the cam slot 191 provides clearance for this projection, as will be seen in Fig. 29, thus permitting the shoulders 206 on either side of the cam slot to abut against the cross-bar of the staple, as shown in Fig. 29, to insure a true formation of the staple. After the staple has thus been formed, the plunger is retracted and the staple is moved downwardly by the fingers 193 on the staple shifting lever 180 into position in front of the tongue 189 of the plunger and between the upwardly extending projections 188 on the bottom cover plate 177. The shifting of the staple is accomplished by the contact member 179 riding upwardly on the forward end of the cam slot 192, thus forcing the fingers downwardly into contact with the upper edges of the legs of the staple. This action takes place at the extreme portion of the rearward movement of the plunger, as will be evident from an inspection of Fig. 27. When the plunger again moves forwardly, the staple that has been formed during the previous forward stroke will lie between the projections 188 and directly in the path of movement of the tongue 189 of the plunger. As the tongue 189 moves forwardly it will, of course, force the staple before it and press the legs of the staple through the overlapping corner portions of the box flaps 39 and 40, as shown in Fig. 29. As the legs of the staple push through the corner flaps they contact with, the outer face of the plunger 45 and are thus bent over or clinched in position. The surface of the plunger is provided with corrugations or grooves 210 for this purpose. During the driving operation of the staple by the tongue 189, a second staple is being formed by the bars 190, which second staple is moved into position in front of the tongue 189 at the end of the next return stroke of the plunger. The fingers 193 are moved out of the way of the staple forming bars 190 during the forward stroke of the plunger by the weight of the rear end of the lever 180 which moves the contact member 195 into the cam groove 192, positive movement being assured by contact between the member 194 and the rear end of the cam groove 191. It will thus be seen that at each stroke of the plunger one staple is driven into the box, and a second staple is formed and moved into position to be driven by the next succeeding stroke.

A special plate 215, Fig. 15, is provided for holding the stapling head just described, and which is designated generally by the numeral 216. The plate 215 is provided with an opening 218 to receive the upright bars 26 in the same way that they are received by the openings 31 in the spacer blocks 27. Similarly the plate 215 is provided with corner notches 219 to fit the projections 29 on the upwardly extending plate 25. By this arrangement the plate 215 may be held at any position in the stack of spacer blocks 27 in which it may be found desirable to place it for properly locating the staples in the overlapping flaps of the box corners. The stapling head 216 is provided with downwardly extending pins 220 which register with openings 221 in the upper surface of the plate 215. A number of these openings is provided to permit adjustment of the stapling head laterally relative to the plate. Upwardly extending projections 222 are formed in the upper surface of the plate 215, the upper surface of which projections lie in the same plane as the upper surface of the stapling head 216 so that the spacer block which is placed next adjacent the plate 215 will bear equally on the projections 222 and the upper surface of the stapling head. When a stack of blocks is formed up with the special plates 215 and their stapling heads in position, the entire stack is held in place by thumb screws 225, Fig. 11, threaded into the corner folders 33 and arranged to bear against the upper surface of the uppermost plate 27. The plate 215 carries also a rearwardly extending portion 226 upon which a portion of the wire feeding mechanism is mounted, as will be later explained.

The reciprocating bars or plungers 176 of the stapling heads are operated from a series of upright shafts 230, Figs. 3 and 8, there being one of these shafts for each of the four corners of the machine. One of the shafts 230, as shown at the lower right hand corner of Fig. 8, is provided with a spiral gear 231, which meshes with a corresponding gear 232 mounted on the shaft 86, but is free to rotate thereon. The gear 232 is provided with an extending sleeve or hub 233, having a collar 234 rigidly secured to the end thereof by means of a set screw 235. A second collar 236 is rigidly secured to the shaft 86 with one of its lateral faces adjacent the lateral face of the collar 234. A spring pawl 237 is carried by the collar 236 and co-operates with ratchet teeth 238 in the collar 234. By this arrangement a oneway drive is provided for transmitting power from the shaft 86 to the gear 232, and hence to the shaft 230. The collar 234 is provided with a sprocket wheel 239 on which a sprocket chain 240 operates. The sprocket chain 240 extends over a corresponding sprocket wheel on a shaft 241, Fig. 2, to which a hand wheel 242 is attached. Rotation of the hand wheel 242 will drive the gears 231 and 232 and the shaft 230 without rotating the shaft 86 because of the ratchet connection between the collars 234 and 236. This permits operation of the stapling mechanism through the connecting gearing, to be described, without rotating the shaft 86, and consequently without operating the plungers 45. The shafts 230 are provided at their lower ends with sprocket wheels 243 over which a sprocket chain 244 is trained for the purpose of causing all of the shaft 230 to operate in unison. A series of rollers 245 attached to links 246 and the arms of a support 247 constitutes a tightener for the sprocket chain 244. The support 247 is held in adjusted position by a threaded rod 248, Figs. 3 and 7, provided with a lock nut 249. The ends of the rod 248 is secured to a lug 250 which is swiveled in a slot in one arm of the support 247. The rod 248 has threaded engagement with a crossbeam 251 of the machine frame.

As shown in Fig. 3, the shafts 230 are connected by means of telescoping extensions 255 and universal joints 256 and 257 with upright shafts 258, journaled one in each of the sliding blocks 15. Carried by each shaft 258, below the supporting beam 3, is a spur gear 259, Figs. 3, 9 and 12. As shown in Fig. 9, these shafts also carry directly above the spur gear 259 one member 260 of a Geneva drive. The other member 261 of the Geneva drive, see also Fig. 19, is secured to a shaft 262 journaled for rotation in the block 15. The shaft 262 drives the wire feeding mechanism, as will be described. The spur gear 259 in each of the blocks 15 meshes with a pair of spur gears 265, each of which is secured to a shaft 266 journaled in the block 15. The shafts 266 are provided with beveled gears 267 rigidly secured to their upper ends and located in recesses 268 in the upper surface of the block. Each of the gears 267 has a crank pin 269 let into the upper surface thereof. A short pitman rod 270 connects the pin 269 with a corresponding pin 271, secured to a reciprocating slide 272, Figs. 11 and 12. The slide 272 reciprocates in a channel 273 formed in the upper surface of the block 15, and there are two such channels and reciprocating slides in each of these blocks. As will be understood from Fig. 12, these channels and slides are positioned at right angles with one another so that the slides may operate the two sets of stapling heads arranged for inserting the fasteners into the adjacent sides of the box which meet at right angles to form a box corner. The forward portions of the slides 272 are provided with projecting lugs 274 upon which the box which is being formed rests when the plungers 45 reach their extreme lower position. Each slide 272 carries on its upper surface an upwardly projecting plate 275 by means of which connection is made between the reciprocating slide and the corresponding plunger 176, by means of which the particular stapling head connected with this slide is operated. As shown in Figs. 2, 10 and 19, each plate 275 is provided with an inclined edge 276 which co-operates with a notch 277 in a block 278 secured to a plunger 176. The block 278, as shown in Fig. 15, is provided with a recess 279 into which the plunger 176 extends and in which it is held by a set screw 289. The depth to which the plunger extends into the recess is regulated by an adjusting screw 281 provided with a lock nut 282. In setting the block on the plunger, the adjusting screw 281 is first set, and the block is afterward permanently secured in place by means of the set screw 280 with the end of the plunger in contact with the end of the adjusting screw. As previously stated, the position of a stapling head may be adjusted vertically by shifting it relatively to the spacer blocks 27. At the same time that it is adjusted vertically, it is also adjusted horizontally, the line of movement of the stapling head corresponding to the angle of the inclined face 276 of the plate 275. The openings 221 in the special block 215 which carries the stapling head are so spaced that there is a set of these openings for the positioning pins 220 for each vertical position of the stapling head, the openings being properly located to bring the notch 277 of the block 278 in proper relation with the inclined surface 276. It will be understood that this arrangement brings the stapling head nearer the corner of the box as it is moved downwardly or toward the box bottom. An inspection of Fig. 25 of the drawings will show that this is the correct arrangement, since the staples positioned near the box bottom are also located close to the corners of the box, and the staples located farther up on the sides of the box are also spaced a greater distance from the corners. It will also be seen from this figure that two staples are used for the flaps at one side of the box. In order that these two staples may be driven at one operation, a pair of stapling heads instead of a single one is placed in one of the stacks of spacers 27 at each corner of the box, while a single stapling head is placed in the other stack, as shown in Fig. 11. It will now be understood that for each rotation of the shaft 266, the plungers of each of the stapling heads are reciprocated to drive a staple into the box corner. The parts are so timed that the plungers reach their extreme forward position at the same time that the projections 274 are extended beyond the surfaces of the spacer blocks 27, and also at the same time that the plungers 45 reach their lowermost position. The extent of the forward movement of the driving plungers 176 may be regulated by means of the adjusting screws 281 in the manner previously described.

It will be understood from an inspection of Fig. 9 that during the greater part of the rotation of the shaft 258, the shaft 262 will remain stationary, but that at a certain point in the rotation the pin 290 carried by the gear member 260 will mesh with an opening 291 in the gear member 261 and impart a partial rotation to the shaft 262. The shaft 262, as shown in Fig. 19, has a pinion 292 secured thereto at the upper surface of the block 15. This pinion meshes with a corresponding pinion 293 on a complementary shaft 294 journaled in the block 15. The pinions 292 and 293 each mesh with a pinion 295 carried on stud shafts 296 journaled in openings in the upper surface of the block 15, and each carrying wire feed rollers 297 rigidly secured thereto. Casings 298 partially surround the rollers 297 and provide bearings for the upper ends of the shafts 296, these casings being secured to the upper surface of the block 15. The shafts 262 and 294 extend respectively into openings in the projecting portions 226 of the special spacing plates 215 which carry the two sets of stapling heads 216. Each extension 226 has a plate 300 pivoted thereon for movement about an axis 301, the plate being spaced upwardly from the projection by a spaced portion 302 secured to the upper surface of the projection. A roller 303 is interposed between the plate 300 and the projection 226 and is provided with an upwardly extending shoulder 304 which is journaled in an opening 305 in the plate 300, Figs. 15, 17 and 18. The interior of the roller 303 is provided with a series of grooves or keyways 307 which fit over projections or ribs 308 extending longitudinally of the upper portions of the shaft 262 or 294, as the case may be. The ribs 308 are smaller than their corresponding openings 307, and the bore of the roller 303 is also greater than the shaft which passes therethrough. This permits slight lateral movement of the roller relative to the shaft without disturbing the driving connection between the roller and the shaft. Each plate 300 is provided with a spiral spring 309 which tends to draw the plate and the roller journaled therein toward the corresponding feed roller 297. A block 310 is secured to the upper surface of the projection 226 by a machine screw 311, and is provided with a guide slot through which the wire 186 is directed between the periphery of the roller 303 and the periphery of the roller 297. The wire after passing between the rollers is guided along the vertical edge of the spacer block 302 and through an opening in the block 222, and thence to the wire guide 196 in the stapling head. It will be seen that the spring 309 produces a resilient pressure between the two feed rolls so that at each partial rotation of the shaft 262 caused by the Geneva drive, the wire will be fed forwardly, the amount of feed corresponding to the length of wire necessary to form the staple. The timing of the feeding operation is so arranged that the wire is fed into the stapling head at the proper time to be acted upon by the reciprocating plunger 176, as previously explained. The wire is supplied from a series of spools carried by spindles 312 projecting upwardly from plates 313 secured to brackets 314 fastened to the outer corners of the blocks 15, as shown in Figs. 1, 2 and 7.

After the corners of a box have been secured by the wire staples, driven in the manner described, the plungers 45 are withdrawn from within the box, and the box is discharged downwardly from the machine. In order to strip the box from the plungers as they move upwardly, the spacer block 27 located immediately above the uppermost stapling head is provided with a spring-pressed stripper plug 315, Figs. 11, 13 and 14. The stripper plugs are inserted in holes 316 drilled in the edge of the spacer blocks, and the plugs are held in place by pins 317 passing through a notch 318 cut in the side of the plug. A spiral spring 319 normally forces the plug outwardly so that it projects slightly from the edge of the block 27. The upper surface of the end of the plug is beveled at 320 so that the stripper will offer no resistance to the downward movement of the box, but the lower surface of the ends of the plug is provided with a shoulder 321, which engages the edge of the upturned sides of the box after the corners have been fastened and thus strips the box from the plungers during the upward movement of the latter. After the plungers have been drawn upwardly, the box is forced downwardly by arms 325, Figs. 3, 10, 11 and 24. The arms 325, as shown in Fig. 12, are operated by shafts having journal bearings carried in the block 15 and having beveled pinions 326 which mesh with the beveled pinions 267 driven by the shafts 266. Each arm 325 is provided with a set of gears 327, the number of gears in each set varying somewhat, but the arrangement being such that each arm 325 is rotated inwardly and downwardly against the upper edges of the upturned sides of the box, as shown in Figs. 3 and 24. This movement not only forces the box downwardly from between the upright surfaces formed by the spacer blocks 27, but also bend the sides of the box inwardly somewhat, as shown in Fig. 24, thus overcoming the tendency of the sides to spring outwardly and giving them a permanent set in a plane substantially at right angles to the bottom of the box. As the box is thus forced downwardly it falls upon the upper surface of a conveyor belt 328, Fig. 3, passing over a roller 329 journaled in bearings carried by the frame 1 of the machine, and located beneath the central portion of the machine, and spaced inwardly from the lateral sides thereof. The roller 329 is driven by a sprocket chain 330 from the shaft 86. The outer end of the conveyor belt may be supported by an idler roller at any position desirable so that the boxes as they are formed are transported from the machine and discharged at a convenient position.

The operations of the various parts of the machine have been described in connection with the description of the construction thereof and it will, therefore, be unnecessary to again describe in detail the functions of the various parts. A general review of the operations as a whole will, however, be given. The blanks to be formed into boxes are placed upon a loose shelf or tray and resting upon a truck, or moved into position above the brackets 93 and the brackets raised until the tray holding the blanks rest upon the brackets. The machine is set by means of the hand wheels 10 and 23 so that the opening between the inner portions of the angular-shaped corner folders 33 corresponds in size and shape to the outer contour of the box to be formed as determined by the score lines 37 and 38 on the blank. The guides 141 are adjusted by means of the hand wheel 151 to bring the vertical portions of these guides into proper spaced relation to permit the insertion of the blanks between these portions of the guides. The stapling heads are properly arranged between the spacer blocks 27 to locate the staples in the desired positions in the overlapped portions of the sides of the box, and the wire from which the staples are to be formed is placed upon the spindles 312 and threaded into the wire-feeding mechanism. When power is supplied to the machine, the lever 158 will reciprocate the follower 152, and at each reciprocation of this follower, the attendant places a blank upon the guides 141 in front of the follower. The blank is moved forwardly along the guides 141 until checked by the stops 168. When this occurs, the plungers 45 move downwardly forcing the blank past the corner folders 33, which folders bend the side flaps of the blank upwardly, one flap at each corner moving a little in advance of the other so that the two flaps are easily overlapped and slide upon one another by a continuous movement until the folded portions are brought into vertical position at the corners of the box. When the plungers 45 have reached the lower portion of their movement, the slides 272 are in their forward position so that the projections 274 form a support for the folded blank. At the same time the staple driving plungers 176 are advanced and force the staples which have been formed during the previous cycle through the overlapping corners of the box, thus forcing the ends of the staples against the vertical sides of the plungers 45. As the plungers 45 are withdrawn, the box is stripped therefrom by the stripper plugs 315 and is afterward forced downwardly by the rotating arm 325, which at the same time bend the sides inwardly to give them a permanent set at right angles to the bottom of the box. The complete box falls upon the conveyor 328 and is discharged from the machine. It will thus be seen that the mechanism is entirely automatic in completely forming the box from the paper blank and in fastening the parts of a box together after the folding operation. All four corners of the box are formed simultaneously and at a single operation of the machine. The machine is adapted to operate upon boxes of various sizes and shapes, and no special form is required for the different sizes and shapes. The adjustment for the various boxes is easily and quickly accomplished so that a single machine is capable of operating upon a wide range of containers.

I claim:

1. A box-forming machine having a plurality of folding devices for different portions of a box blank, said devices including means for folding overlapping corner flaps, means for supporting said devices in stationary position relative to one another during a folding operation thereof, and means for simultaneously moving different portions of a box blank relative to said folding devices for operating said devices to completely fold said blank into box formation at a single operation.

2. In a box forming machine, adjacent stationary abutments for simultaneously folding adjacent sides of a sheet or box blank into box formation, said abutments having their contact surfaces shaped to guide the adjacent end portions of said sides into overlapping position, and means for moving a blank in contact with said abutments.

3. A box forming machine having a plurality of folding units, means for holding said units in fixed position relative to one another during the folding operations thereof, and means for causing said units to act simultaneously on separate portions of a box blank to completely fold said blank into box formation at one operation.

4. A box forming machine having a plurality of substantially duplicate operating units comprising stationary folders for overlapping corners, means for holding said units in different fixed positions relative to one another during the folding operations thereof, and means for causing said units to act on separate portions of a box blank to form a box therefrom, each unit acting upon one portion only of said blank during a single box forming operation.

5. A box forming machine comprising a plurality of corner folders, means for holding said folders in fixed position relative to one another during the folding operations thereof, and means for forcing a box blank between said folders to cause said folders to act simultaneously on separate corners of said blank and completely fold said blanks into box formation while said folders remain in said fixed position.

6. In combination, a corner folder for box blanks having rigidly connected abutment members comprising guides for directing corner portions of a box into overlapping relation, said members meeting at an angle to one another, and means for forcing a blank through the angle included by said members to cause the portions of said blank which contact with said members to be folded into planes at an angle to the main portion of said blank.

7. In combination, a corner folder for box blanks having rigidly connected arms meeting at an angle to one another to form an abutment member, and a plunger cooperating simultaneously with said arms and within the angle included thereby and arranged to force the bottom forming portion of a box blank through said angle to cause other portions of said blank placed upon said arms to be simultaneously folded into position to form the sides of the box.

8. A folder for box blanks having rigidly connected arms arranged at an angle to one another for simultaneously engaging adjacent side flaps of a blank, and means for moving the body portion of said blank relative to said arms to cause simultaneous folding of said flaps.

9. A former for box blanks having side flaps, comprising folders for said flaps arranged to move the end portions of said flaps toward folded position in advance of the central portions thereof and for subsequently bringing the central portions of said flaps into the planes of the end portions thereof, and means for holding said folders in fixed position relative to one another during a folding operation.

10. A former for box blanks having side flaps, comprising folders for said flaps arranged to contact with said flaps near the ends thereof and to bend said ends inwardly toward folded position in advance of the central portions of said flaps thus imparting a curved formation to said flaps during a folding operation and means for subsequently alining the central portion of said flaps with the ends thereof.

11. A former for box blanks having side flaps, said former having folders for said flaps arranged to impart a curved formation to said flaps during a folding operation and for subsequently straightening said flaps.

12. A former for box blanks having side flaps, said former having folders arranged to impart a curved formation to said flaps on adjacent sides of a blank during a folding operation to cause the adjacent end portions of said flaps to slide upon one another with their lateral surfaces in contact with one another and means for straightening said side flaps after the ends thereof have moved into overlapping relation.

13. A former for box blanks having side flaps comprising a corner folder arranged to contact with the adjacent end portions of adjacent flaps and to impart a curved formation to said flaps during folding operation to cause said end portions to slide upon one another during such operation.

14. In combination, a corner folder for box blanks having side flaps, said folder being provided with a curved surface for contacting with adjacent end portions of two of said flaps, and means for moving a blank relative to said corner folder to cause said folder to move said flaps into formed position.

15. In a box forming machine, a plurality of folders arranged to contact with side flaps on a box blank, said folders having contact surfaces curved to form rounded corners for forming the corners of a box. and means for forcing a blank through the space included between said folders to simultaneously move said flaps into position to form the sides of a rectangular box.

16. In a box forming machine, a plurality of folders having contact arms arranged at an angle with one another, said arms having surfaces curved about the apexes of said angles, and means for moving a blank through the space included between said folders to cause said arms to bend the side portions of said blank inwardly with a continuous simultaneous movement to form the sides of a rectangular box.

17. A corner folder for forming boxes from prepared blanks comprising arms meeting each other at an angle, said arms having their inner surfaces shaped to produce a continuous curve at the point where the blank first contacts with said folder.

18. A corner folder for a box blank comprising folding surfaces meeting one another adjacent the corner portion of the box when formed said surfaces being shaped to form a substantially continuous curve at the position where the blank first contacts with said folder and to meet at an angle with one another at a point reached during subsequent movement of said blank.

19. A corner folder for box blanks having folding surfaces meeting one another adjacent the corner of the box being formed, said surfaces being shaped to form a substantially continuous curve at the position where the blank is first operated upon by said folder to impart a curved formation to the portions of the blank being folded so that said portions are made to slide upon one another into folded position by a continuous operation.

20. In a box forming machine, a folding device for each corner of a box blank to be folded into box formation each of said folding devices being curved to cause the side portions of said box blank to slide upon one another by a continuous movement during a folding operation, and means for moving said blank relative to said corner folders to cause such folding operation.

21. In a box forming machine, a folder for each corner of a box blank, said folders having curved surfaces meeting one another adjacent the corners of said blank and arranged in a substantially continuous curve at the position where said blank is first operated upon by said folders and at an angle to one another at a subsequent position of said operations, and means for moving said blank through the space included between said corner folders to cause a folding operation.

22. A former for box blanks having side flaps, comprising folders for said flaps arranged to move the end portions of said flaps toward folded position in advance of the central portions thereof with the end of one flap slightly in advance of the adjacent end of an adjacent flap.

23. In a box forming machine, a plurality of folders for the corners of a box blank, said folders having contact portions for moving the sides of said blanks into position to form the sides of a box, said contact portions being arranged to move the end of one of said flaps toward folded position slightly in advance of the cooperating end portion of the adjacent flap.

24. In a box forming machine, a corner folder having contact arms arranged at an angle with one another for moving into overlapping position the adjacent ends of adjacent side flaps, the contacting surface of one of said arms being arranged to extend beyond the contacting surface of the other of said arms to move one of said end portions slightly in advance of the other so that said portions will pass one another when they are moved inwardly toward folded position.

25. In a box forming machine, a corner folder having contact arms arranged at an angle to one another, said arms having contact surfaces, one of said surfaces being arranged slightly in advance of the other to move the overlapping ends of adjacent side flaps into position to pass one another during a folding operation, said arms being shaped to impart a curved formation to said side flaps so that their ends will easily slide upon one another during a folding operation.

26. A machine for forming boxes from blanks having side flaps separated from one another by slots at the corners of said blanks, a contact member arranged to engage adjacent ends of two of said side flaps near one corner of said blank, said contact member having an extended portion for engaging one of said flaps slightly in advance of the engagement of the other of said flaps.

27. In a box forming machine, a plurality of folders arranged to define the corners of a rectangle, means for holding the box-engaging portions of said folders in fixed position relative to one another during a box-forming operation, and means for forcing a blank through the space included within said rectangle to cause said folders to bend the overlapping sides of said blank into folded position to form a rectangular box.

28. In a box forming machine, a plurality of angularly shaped folders arranged in rectangular formation with open spaces between said folders at the sides of said rectangle, and means for forcing a box blank through the space included in said rectangle to cause portions of said blank extending over said folders to be bent inwardly to form the sides of a box.

29. In combination a plurality of angular shaped folders positioned in rectangular formation, means for forcing a box blank through the space included by said folders, said folders having contact members for the side portions of said blank arranged to bend said side portions inwardly as the blank is moved and to cause the ends of said side portions to slide upon one another into overlapping position.

30. In a box forming machine, a plurality of folders arranged in rectangular formation each folder being placed at one corner of the rectangle and provided with contact arms meeting at the corner of said rectangle, said arms having curved surfaces and one arm of each folder extending beyond the other to contact with a blank in advance of the other during a box forming operation, and plungers movable within a space included within the angle between the arms of said folders and spaced from the said arms a sufficient amount to admit the thickness of the side walls of a box between said plungers and said arms.

31. In a box forming machine, a folder comprising a pair of walls meeting at an angle, said walls being beveled at one extremity thereof and arranged to gradually move the side portions of a box blank into folded position as said blank is moved relative to said folder so as to cause the folded sides to lie against said walls, and fastening devices carried within said walls for securing said folded sides in their formed position.

32. A box forming machine comprising a skeleton form having angular corner members, means for forcing a box blank into the space included by said corner members to fold the sides of said blank into position to form the sides of the box, and fastening mechanism connected with said corner members for securing the sides thus folded while in position within said skeleton form.

33. In combination, means for folding the sides of a box blank into box formation with the ends of said sides overlapping at each side of a corner of said box, and simultaneously operable means for inserting fastening devices into said overlapping portions at each side of said box corner and adjacent thereto.

34. Mechanism for fastening the corner portions of a box comprising a pair of devices for inserting fasteners, said devices being arranged at an angle to one another in position to operate adjacent a box corner and at opposite sides thereof.

35. In a box forming machine, a corner folder having angularly arranged arms for contacting with the side flaps of a box blank and folding said flaps into position to form the sides of a box with the ends of the flaps overlapping one another at the box corner, said arms being provided with walls forming a continuation of the inner surface of said arms, and staple driving devices located within said walls for forcing staples into the overlapped portions of said sides.

36. In a box forming machine, a skeleton form having angularly arranged walls at the corners thereof, said walls being flared outwardly at one extremity to form folders for a box blank as it is moved in the said form, staple driving devices located adjacent each of said corners and at opposite sides thereof for inserting fasteners into the folded sides of said box blank after it has been moved in the said form to fold said sides into position to form the sides of a box, and means for simultaneously operating all of said staple driving devices.

37. In a box making machine, means for folding the sides of a blank into position at an angle of the main body of said blank and for overlapping the end portions of said sides at the corner of the box thus formed, and means for simultaneously inserting fasteners through said overlapped portions adjacent said corner and at opposite sides thereof.

38. In a box making machine, means for folding the sides of a box blank into box formation and for overlapping the side portions of said box at the corners thereof, a head for inserting fasteners through said overlapped portions, and adjustable means for holding said head in various positions so that said fastening head may be arranged in suitable positions for various shapes and sizes of boxes.

39. In a box making machine, means for folding the sides of a blank into position to cause the ends of both of two adjacent sides to overlap at the corners of the box so formed, and means for simultaneously inserting a plurality of staples in the overlapping portions at one side of a box corner.

40. In a box making machine, means for folding the sides of a blank into position to overlap one another at each side of the corner of the box so formed, and means for simultaneously inserting fasteners in said overlapping portions adjacent a corner of the box so formed and at opposite sides of said corner.

41. In a box making machine, means for folding the sides of a blank into position to form a box and for overlapping said sides at a corner of the box so formed, and means for simultaneously inserting a plurality of staples in said overlapping portions adjacent said corner and at one side thereof and for simultaneously inserting a staple adjacent said corner at the other side thereof.

42. In a box making machine, means for folding the sides of a box blank having a diagonal slit at the corner thereof so as to cause the portions disconnected by said slit to overlap at both sides of the corner of the box thus formed, and means for inserting a plurality of staples through said overlapped portions at one side of said corner, said inserting means being located so as to position said staples along a line parallel with the edge formed by the slit portion of said blank.

43. In a box making machine, a corner folder having arms arranged at an angle to one another, a plunger having angularly disposed surfaces to correspond with the arms of said folder, means for moving said plunger relative to said folder to move a box blank through the space included between said folders to cause portions of said blank to overlap one another adjacent the corner of a box thus formed and on opposite sides of said corner, and devices connected with each of the arms of said folder for inserting securing fasteners through the overlapped portions of said blank and into contact with the surfaces of said plunger to secure said overlapped portions in position, said plunger surfaces operating as an anvil for clinching said securing devices.

44. In combination, a plurality of devices including internal form members for operating upon the corners of a box blank, and means for adjusting said devices relative to one another to accommodate different sized boxes and for maintaining said devices in rectangular relation with one another at their various positions of adjustment.

45. In combination, a plurality of devices including internal form members for operating upon the corners of a box being formed, and means for simultaneously adjusting pairs of said devices toward one another to accommodate different sized boxes.

46. In combination, a plurality of units including internal form members for operating upon the corners of a box to be formed, and means for moving said units in sets for adjusting said units to operate on different sized and shaped boxes.

47. In a box-forming machine, a plurality of operating units including internal form members for different portions of a box to be formed, and means for adjusting one of said units selectively in unison with different other units.

48. In a box-forming machine, a plurality of corner-forming units, said units being arranged to define the corners of a rectangle, and means for adjusting a unit at one corner of said rectangle in unison with the unit at either of the adjacent corners of the rectangle.

49. In a box-forming machine, a plurality of corner-forming units, said units being arranged in rectangular formation, and means for simultaneously adjusting said units to vary the length or the width of said rectangular formation.

50. In a box-forming machine, a plurality of corner-forming units, parallel guides for carrying certain of said units, and means for adjusting said units in pairs upon said guides, there being one unit of each pair upon each of said guides.

51. In a box-forming machine, a pair of guides arranged parallel with one another, a pair of corner-forming units mounted upon each of said guides, and means for adjusting one unit on each guide in unison with a corresponding unit on the other guide.

52. In a box-forming machine, a pair of parallel guides, a pair of corner-forming units mounted upon each of said guides, said units being arranged in rectangular formation, and means for adjusting each of said units in unison with a corresponding unit on the opposite guide.

53. In a box-forming machine, a pair of guides, a pair of corner units mounted upon each of said guides and adjustable therealong, each of said units being paired with a corresponding unit on the opposite guide, means for adjusting the units so paired in unison along said guides, and means for adjusting said guides toward and away from one another.

54. In a box-forming machine, a pair of guides, a pair of corner units mounted for longitudinal movement along each of said guides, each of said units being paired with a corresponding unit on the opposite guide, said units being thus arranged in rectangular formation, means for adjusting the paired units on opposite guides in unison with one another to vary one dimension of the rectangle included by said units, and means for adjusting said guides relative to one another to vary the other dimension of said rectangle.

55. In combination, a pair of guides, a pair of corner units mounted on each of said guides and adjustable thereon relative to one another, means for adjusting said units on said guides relative to one another and for maintaining a rectangular formation of said units during said adjustment, and means for adjusting said guides relative to one another.

56. In a box-forming machine, a pair of guides arranged in parallel relation, means for adjusting said guides laterally relative to one another, corner-forming units mounted on said guides and movable longitudinally thereof, and means for adjusting said units along said guides in pairs, one unit of each pair being carried by each of said guides.

57. In a box-forming machine, a guide, a pair of corner-forming units adjustably mounted on said guide, a shaft extending along said guide and journaled for rotation thereon, and threaded connection between said shaft and one of said units for adjusting said unit relative to said guide.

58. In combination, a pair of guides, a pair of corner-forming units mounted on each of said guides, a shaft extending along each of said guides and journaled for rotation thereon, threaded connection between each of said shafts and a corner unit on the corresponding guide, and means for rotating said shafts in unison with one another to cause simultaneous adjustment of a unit on each guide.

59. In a box-forming machine, a guide, a pair of corner units mounted on said guide, a shaft extending along said guide and having threaded connection with said units, the threads of said connections being in reversed directions to one another, and means for rotating said shaft for adjusting said units toward or away from one another.

60. In a box-forming machine, a pair of guides, a pair of corner units mounted for sliding movement along each of said guides, shafts connected with each of said guides and having threaded connections with each corner unit thereon, the threads of each shaft being arranged in reversed directions, and means for operating said shafts in unison to cause simultaneous adjustment of all of said units along their respective guides.

61. In a box-forming machine, a pair of ways, a pair of guide beams having their opposite ends mounted for sliding movement along said ways, and a pair of corner-forming units mounted for sliding movement upon each of said guide beams.

62. In a box-forming machine, a pair of parallel ways, a pair of parallel guide beams mounted for movement along said ways toward and away from one another, and a pair of corner-forming units mounted on each of said guide beams and adjustable therealong.

63. In a box-forming machine, a pair of ways, a pair of guide beams having their ends mounted to slide upon said ways, a shaft carried by each of said ways and having threaded connection with one of said guide beams, and means for rotating said shafts in unison with one another to adjust said guide beams relative to one another upon said ways.

64. In a box-forming machine, a pair of parallel ways, a pair of guide beams mounted to slide upon said ways and arranged parallel with one another, shafts carried by said ways and having threaded connections with said guide beams for adjusting said guide beams relative to one another, means for simultaneously operating said shafts, corner-forming devices mounted on said guide beams, shafts carried by said guide beams and having threaded connection with said corner-forming devices, and means for simultaneously operating said last-mentioned shafts to adjust said corner-forming devices along said guide beams relative to one another.

65. In combination, mechanism for forming a box from a flat blank, said mechanism comprising means for bending the sides of said blank inwardly at the corners and fastening said corner portions and subsequently bending the central portions of said sides inwardly an additional amount to give them a permanent set, in box form.

66. In combination, mechanism for forming a box from a prepared blank, and means for discharging the box, said discharging means being arranged to simultaneously bend the sides thereof past their normal position to give said sides a permanent set.

67. In combination, a form, means for moving a blank into said form to fold said blank into box formation, and means for engaging the sides of the box thus produced to discharge said box from said form and simultaneously move the engaged sides past their normal position to impart a permanent set thereto.

68. In combination, an open form, a plunger for forcing a blank into said form to fold said blank into box formation, and a spring-pressed catch movable into retracted position by said blank as it is moved into said form and arranged to be forced outwardly by its spring to prevent return movement of said blank.

69. In combination, an open form, a plunger for forcing a box blank into said form to fold the sides thereof into box formation, a spring-pressed catch for preventing return movement of the box thus produced upon the withdrawal of said plunger, and means for engaging the sides of said box to remove said box from said form and simultaneously press the sides of said box inwardly to impart a permanent set thereto.

70. In combination, mechanism for bending the sides of a blank inwardly and for securing said sides at the corners of the box thus formed, and arms for engaging the sides of the box thus produced to discharge said box from said mechanism and simultaneously force the central portions of said sides inwardly to cause said sides to take a permanent position in a plane substantially perpendicular to the bottom of the box.

71. In combination, a plurality of corner folders for box blanks, and rotatable arms located intermediate said corner folders and arranged to engage the sides of the box blank to move the central portions of said sides into box-forming position and to discharge the box after it has been formed.

72. In combination, a plurality of corner folders for a box blank, arms intermediate said corner folders, and means for rotating said arms so that they will move inwardly into contact with the sides of a box blank which has been operated upon by said corner folders to force said sides into box-forming position.

73. In combination, a plurality of corner folders arranged in rectangular formation, means for moving a box blank through the space included by said folders to form the corners of a box from said blank, and arms interposed between said corner folders and rotatable inwardly and downwardly to force the sides of the box past normal position to impart a permanent set thereto and simultaneously to discharge the box from the machine.

74. In a box-forming machine, a plurality of corner-forming units, a shaft for driving each of said units, and an endless belt for driving all of said shafts in unison with one another.

75. In a box-forming machine, a plurality of corner-forming units, an upright shaft for driving each of said units, sprocket wheels connected with each of said shafts, an endless chain passing over said sprocket wheels to cause said shafts to rotate in unison with one another, and means for taking up slack in said chain.

76. In a box-forming machine, a plurality of corner-forming units, upright shafts connected with said units, sprocket wheels for driving said shafts, an endless chain passing over said sprocket wheels, a tightener for said chain comprising rollers for engaging said chain intermediate said sprocket wheels, links connected with said rollers, and a spider for simultaneously drawing inwardly on said links to cause said rollers to take up slack in said chain.

77. In a box-forming machine, a plurality of corner-forming units, upright shafts for driving the mechanism of each of said units, and driving mechanism for said shafts arranged to permit adjustment of the position to said units relative to one another without disturbing said driving connection.

78. In a box-forming machine, a plurality of corner-forming units, upright shafts for operating the mechanism of said units, stationary gearing for driving said shafts, and flexible connections between said shafts and said gearing to permit adjustment of said corner-forming units without disturbing the driving connection between said gearing and said shafts.

79. In combination, a pair of guides for supporting a box blank, means for adjusting said guides relative to one another to accommodate blanks of different sizes, and a supplemental means for adjusting said guides.

80. The combination with box-forming mechanism, of means for adjusting said mechanism to accommodate box blanks of different sizes, supports for said box blanks, and means for adjusting said supports independently of said first-mentioned adjusting means.

81. The combination with box-forming mechanism, of means for adjusting said mechanism to form boxes of different sizes, supports for blanks from which said boxes are formed, and means for adjusting said supports relative to said box-forming mechanism and independently of the adjustment of said mechanism.

82. In combination, a box-forming mechanism, means for adjusting said mechanism to accommodate boxes of different sizes, box blank supports connected with said mechanism and adjustable therewith, and supplemental means for adjusting said supports relative to said mechanism.

83. In combination, box-forming mechanism, means for adjusting said mechanism to correspond with different sizes of completed boxes, supports for blanks from which boxes are to be formed, and means for adjusting said supports to correspond to different sizes of said blanks.

84. In a box-forming machine, a plurality of corner folders, means for adjusting said corner folders to correspond to different sizes of completed boxes, box blank supports connected with said corner folders and adjustable therewith, and supplemental means for adjusting said supports independently of the adjustment of said corner folders to accommodate different sizes of box blanks arranged for boxes of different depths for a given lateral dimension.

85. In a box-making machine of the character described, the combination of a corner form, means to bend toward the form a flap of a box blank adapted to constitute one of the walls of the box and an associated tab and a tab on an adjacent flap adapted to form another wall of the box, and means to bend said latter flap and its tab toward the form, whereby one flap and its tab will be bent to the form and around the corner thereof and the other flap and its tab will be bent to the form and around the same corner and overlap the inner flap and tab, substantially as described.

86. In a box-making machine, a plurality of corner forming devices each comprising an inside and an outside die member, and means for adjusting said corner-forming devices as units relative to one another to accommodate said devices to different sized boxes.

87. A box-making machine comprising a plurality of sets of mechanism for forming one corner of a box from a suitable blank, means for operating said sets of mechanism to form the various corners of a complete box, and means for adjusting said sets of mechanism relative to one another to adapt said machine to different sized boxes.

88. In a box-making machine, a plurality of sets of mechanism for forming the corners of boxes, said sets of mechanism each including an interior corner form and means for folding parts of a blank about said form to produce a box corner; and means for adjusting said sets of mechanism relative to one another to adapt said machine to form different sized boxes.

89. In a box-making machine of the character described, the combination of a corner form, means for bending over a tab on a flap of a box blank adapted to constitute one of the walls of the box and for bending toward said form such flap and a tab on an adjacent flap adapted to form another wall of the box and for bending said latter flap and its tab toward said form whereby one flap and its tab will be bent to the form and around a corner thereof and the other flap and its tab will be bent to the form and around the same corner and overlap said inner flap and tab, and means for securing said overlapped corner portions.

90. In a box-making machine of the character described, the combination of a corner form, means to bend over a tab on a flap of the box blank adapted to constitute one of the walls of the box and to bend toward the form said flap and a tab on an adjacent flap adapted to form another wall of the box and to bend said latter flap and its tab toward the form said latter flap and its tab will be bent to, whereby one flap and its tab will be bent to, the form and around a corner thereof and the other flap and its tab will be bent to the form and around the same corner and overlap said inner flap and tab, the tab of said outer flap during the folding operation being guided to the outside of the other flap by the bent tab of the latter, substantially as described.

91. In a box-making machine of the character described, the combination of a corner form, means to bend over a tab on a flap of the box blank adapted to constitute one of the walls of the box and to bend toward the form said flap and a tab on an adjacent flap adapted to form another wall of the box and to bend said latter flap and its tab toward the form whereby one flap and its tab will be bent to the form and around a corner thereof and the other flap and its tab will be bent to the form and around the same corner and overlap said inner flap and tab, the tab of said outer flap during the folding operation being guided to the outside of the other flap by the bent tab of the latter, and means for securing said overlapped corner portions together.

92. In a box-making machine of the character described, the combination of a corner form, and means to bend over a tab on a flap of the box blank adapted to constitute one of the walls of the box and to substantially simultaneously bend toward the form said flap and a tab on an adjacent flap adapted to form another wall of the box and to bend said latter flap and its tab toward the form during the bending operation of the other flap whereby one flap and its tab will be bent to the form and around a corner thereof and the other flap and its tab will be bent to the form and around the same corner and overlap said inner flap and tab, the tab of said outer flap during the folding operation being guided to the outside of the other flap by the bent tab of the latter, substantially as described.

93. In a box-making machine of the character described, the combination of a corner form, means to bend over a tab on a flap of the box blank adapted to constitute one of the walls of the box and to substantially simultaneously bend toward the form said flap and a tab on an adjacent flap adapted to form another wall of the box and to bend said latter flap and its tab toward the form during the bending operation of the other flap whereby one flap and its tab will be bent to the form and around a corner thereof and the other flap and its tab will be bent to the form and around the same corner and overlap said inner flap and tab, the tab of said outer flap during the folding operation being guided to the outer side of the other flap by the bent tab of the latter, and means to secure said overlapped corner portions together.

94. In a box-making machine of the character described, the combination of a corner form, means to bend toward the form a flap of a box blank adapted to constitute one of the walls of the box and an associated tab and a tab on an adjacent flap adapted to form another wall of the box and to bend said latter flap and its tab toward the form whereby one flap and its tab will be bent to the form and around the corner thereof and the other flap and its tab will be bent to the form and around the same corner and overlap the inner flap and tab, substantially as described.

95. In a box-making machine of the character described, the combination of a corner form, means to bend toward the form a flap of a box blank adapted to constitute one of the walls of the box and an associated tab and a tab on an adjacent flap adapted to form another wall of the box and to bend said latter flap and its tab toward the form whereby one flap and its tab will be bent to the form and around the corner thereof and the other flap and its tab will be bent to the form and around the same corner and overlap the inner flap and tab, and means to secure said overlapped corner portions together.

96. In a box-making machine of the character described, the combination of a corner form, means to bend toward a face of said corner flap of a box blank adapted to constitute one of the walls of the box and to bend toward another face of said form another flap of said blank adapted to form another wall of said box and to bend a tab on each of said flaps around a corner of said form and into overlapping relation with the companion flap, substantially as described.

97. In a box-making machine of the character described, the combination of a form, means to bend to said form flaps of a box blank to constitute the sides of the box and to fold a tab at each end of each flap toward the form and into overlapped relation with the adjacent flaps, means to secure said overlapped flaps and tabs together, and means to discharge the box from the form, substantially as described.

In testimony whereof I have signed my name to this specification, on this 26th day of February A. D. 1917.

MICHAEL J. MILMOE.

Witnesses:
L. E. MILLS,
G. J. BECKER.